(12) United States Patent
Madhavan et al.

(10) Patent No.: US 7,777,644 B2
(45) Date of Patent: Aug. 17, 2010

(54) METHOD AND CONDUIT FOR TRANSMITTING SIGNALS

(75) Inventors: Rahgu Madhavan, Houston, TX (US); Bruce W. Boyle, Sugar Land, TX (US); Brian Clark, Sugar Land, TX (US); Stacy L. Johnson, Houston, TX (US); David Santoso, Sugar Land, TX (US); Lise Hvatum, Katy, TX (US)

(73) Assignee: InatelliServ, LLC, Houston, TX (US)

( * ) Notice: Subject to any disclaimer, the term of this patent is extended or adjusted under 35 U.S.C. 154(b) by 932 days.

(21) Appl. No.: 11/564,024

(22) Filed: Nov. 28, 2006

(65) Prior Publication Data

US 2007/0159351 A1 Jul. 12, 2007

Related U.S. Application Data

(60) Provisional application No. 60/749,546, filed on Dec. 12, 2005.

(51) Int. Cl.
*G01V 3/00* (2006.01)

(52) U.S. Cl. .................. 340/854.4; 340/854.8; 367/82; 166/380; 175/171

(58) Field of Classification Search .............. 340/854.4, 340/854.8; 361/82; 166/380; 175/171
See application file for complete search history.

(56) References Cited

U.S. PATENT DOCUMENTS

| | | | |
|---|---|---|---|
| 2,000,716 A | 5/1935 | Polk | |
| 2,096,359 A | 10/1937 | Hawthorn | |
| 2,140,537 A | 12/1938 | McNally et al. | |
| 2,379,800 A | 7/1945 | Hare et al. | |
| 3,170,137 A * | 2/1965 | Brandt | 340/855.1 |
| 3,518,608 A * | 6/1970 | Papadopoulos | 439/191 |
| 3,807,502 A | 4/1974 | Heilhecker et al. | |
| 3,957,118 A | 5/1976 | Barry et al. | |
| 4,126,848 A | 11/1978 | Denison | |
| 4,605,268 A | 8/1986 | Meador | |
| 4,722,402 A | 2/1988 | Weldon | |
| 4,806,928 A | 2/1989 | Veneruso | |
| 4,901,069 A | 2/1990 | Veneruso | |
| 4,943,524 A | 7/1990 | Gordon | |
| 4,953,636 A | 9/1990 | Mohn | |
| 5,052,941 A | 10/1991 | Hernandez-Marti et al. | |
| 5,278,550 A | 1/1994 | Rhein-Knudsen et al. | |
| 5,375,098 A | 12/1994 | Malone et al. | |
| 5,517,464 A | 5/1996 | Lerner et al. | |
| 5,531,592 A | 7/1996 | Tasi | |

(Continued)

FOREIGN PATENT DOCUMENTS

GB 2110270 6/2003

(Continued)

*Primary Examiner*—Timothy Edwards, Jr.
(74) *Attorney, Agent, or Firm*—Conley Rose, P.C.

(57) ABSTRACT

A wired drill pipe for a drill string of a downhole tool positioned in a wellbore penetrating a subterranean formation is provided. The wired drill pipe includes a drill pipe, a cable and a wire retainer. The drill pipe has a slot at each end thereof. The slots are adapted to receive at least one transformer. The drill pipe has an inner surface defining a passage for the flow of mud therethrough. The cable extends from the transformer into the passage of the drill pipe. The wire retainer is positioned on the inner surface of the drill pipe. The wire retainer is adapted to secure the cable therein.

27 Claims, 23 Drawing Sheets

U.S. PATENT DOCUMENTS

| | | |
|---|---|---|
| 5,539,037 A | 7/1996 | Iqbal |
| 5,624,051 A | 4/1997 | Ahern, Jr. et al. |
| 5,971,072 A | 10/1999 | Huber et al. |
| 6,065,500 A | 5/2000 | Metcalfe |
| 6,142,230 A | 11/2000 | Smalley et al. |
| 6,164,126 A | 12/2000 | Ciglenec et al. |
| 6,392,317 B1 | 5/2002 | Hall et al. |
| 6,641,434 B2 | 11/2003 | Boyle et al. |
| 6,670,880 B1 | 12/2003 | Hall et al. |
| 6,799,632 B2 | 10/2004 | Hall et al. |
| 6,866,306 B2 | 3/2005 | Boyle et al. |
| 6,971,450 B2 | 12/2005 | Mackay |
| 7,040,415 B2 | 5/2006 | Boyle et al. |
| 7,053,788 B2 | 5/2006 | Hall et al. |
| 7,064,676 B2 | 6/2006 | Hall et al. |
| 7,116,199 B2 | 10/2006 | Hall et al. |
| 2002/0135179 A1 | 9/2002 | Boyle et al. |
| 2002/0193004 A1 | 12/2002 | Boyle et al. |
| 2002/0193005 A1 | 12/2002 | Kanda et al. |
| 2003/0029641 A1* | 2/2003 | Meehan .................. 175/57 |
| 2004/0119607 A1 | 6/2004 | Davies et al. |
| 2004/0262013 A1* | 12/2004 | Tilton et al. ................. 166/380 |
| 2005/0024231 A1* | 2/2005 | Fincher et al. ........... 340/854.4 |
| 2005/0168349 A1 | 8/2005 | Huang et al. |
| 2005/0200210 A1 | 9/2005 | Kotsonis et al. |
| 2006/0151179 A1 | 7/2006 | Boyadjieff et al. |

FOREIGN PATENT DOCUMENTS

| | | |
|---|---|---|
| RU | 2040691 | 7/1995 |
| RU | 2149261 | 5/2000 |
| RU | 2229582 | 5/2004 |
| WO | WO90/14497 | 11/1990 |
| WO | 9621085 | 7/1996 |
| WO | 2004085796 | 10/2004 |
| WO | 2006079703 | 8/2006 |

* cited by examiner

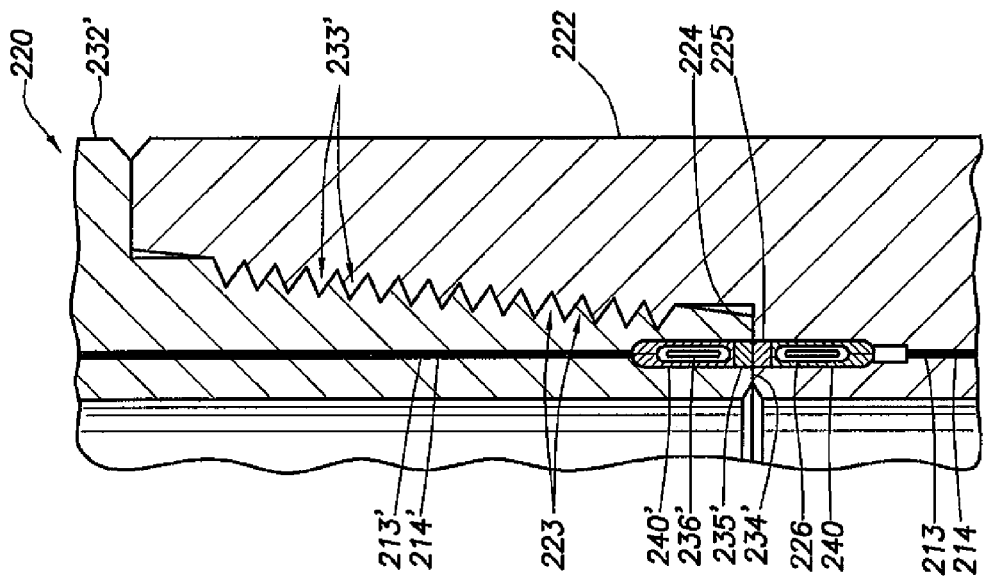
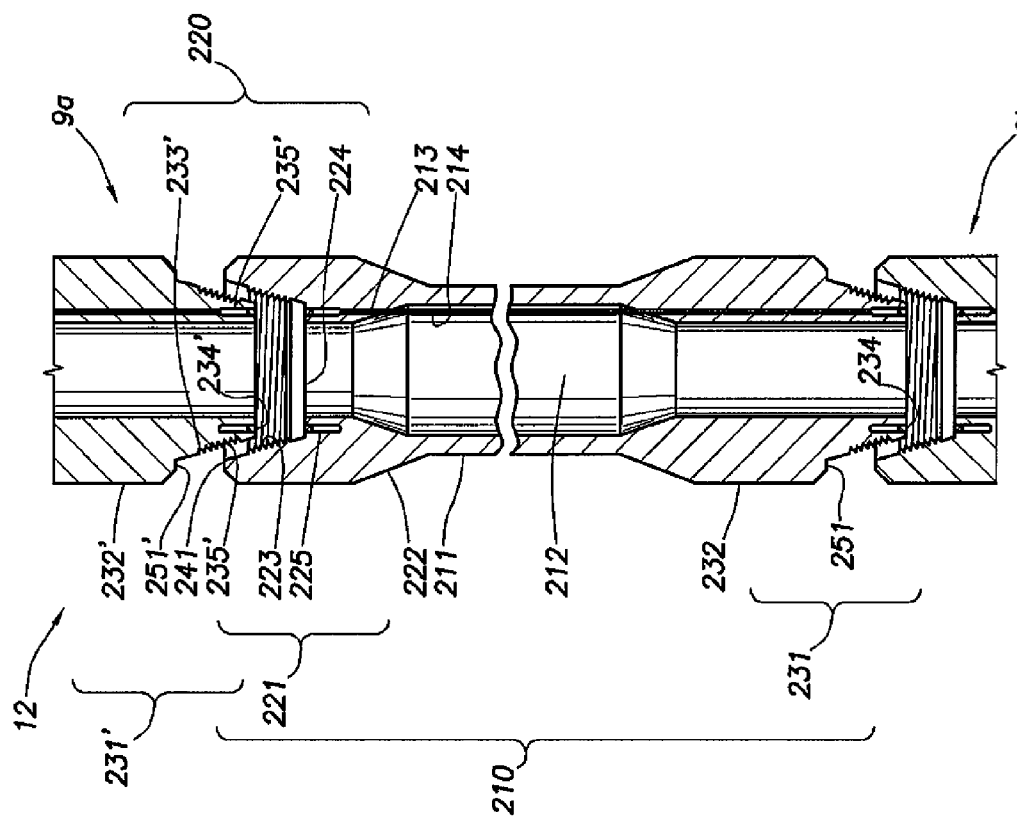

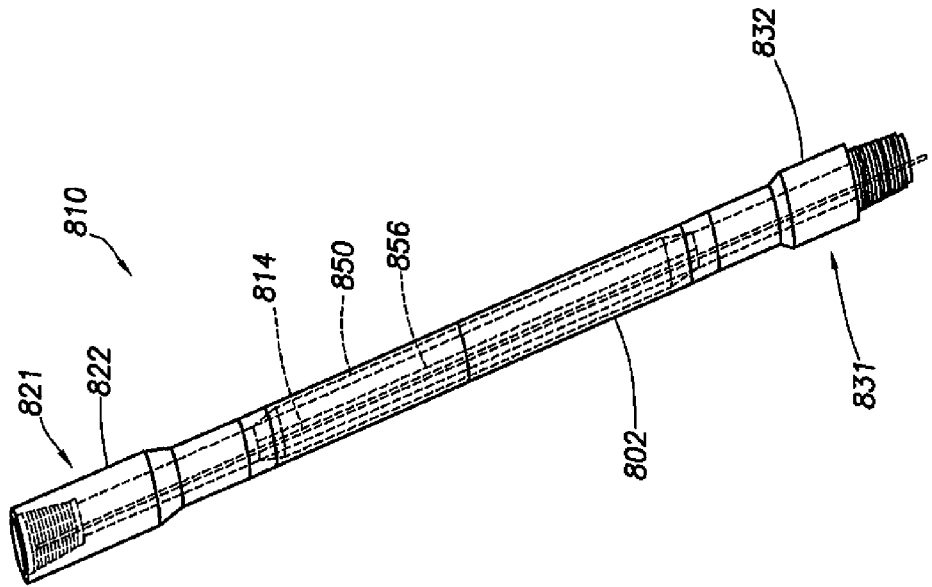
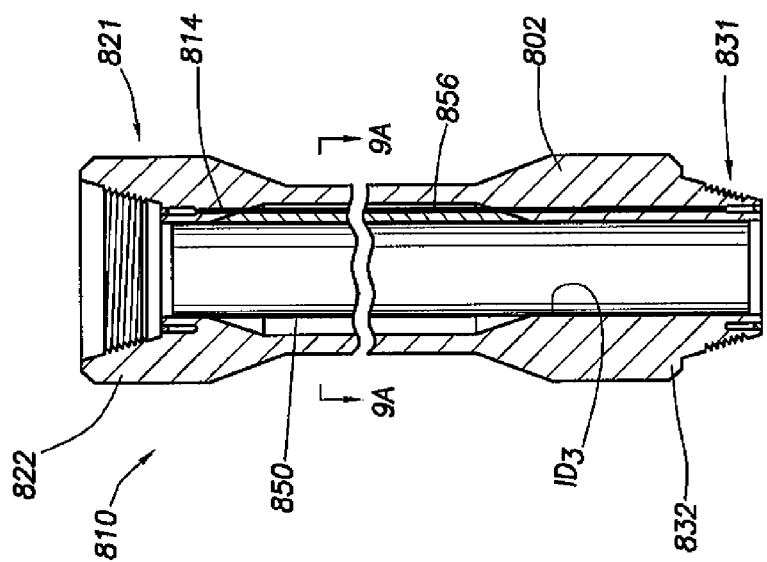
FIG.8B
FIG.8A

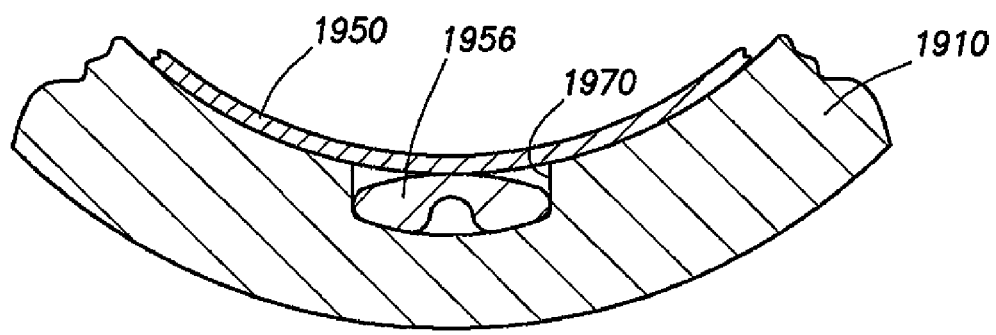
FIG.19B1
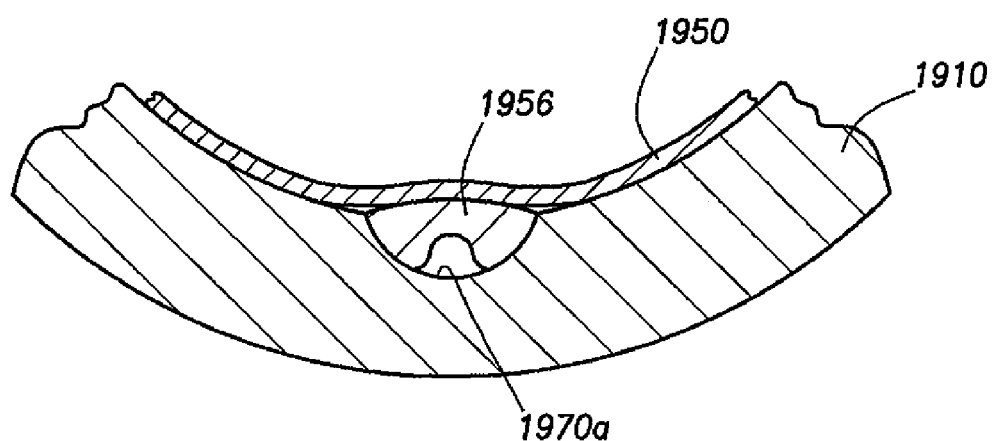
FIG.19B2
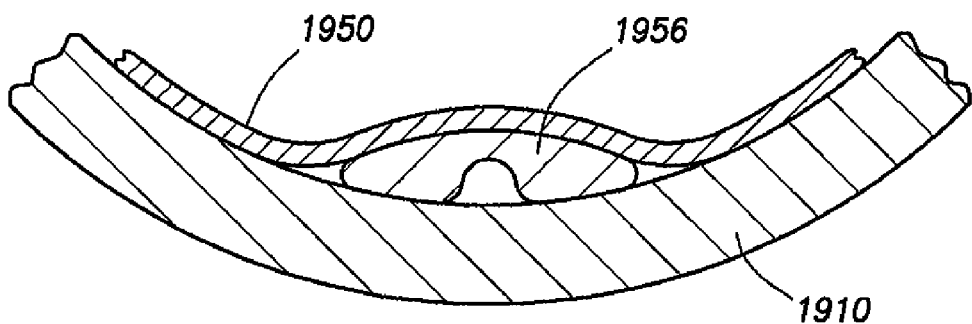
FIG.19C

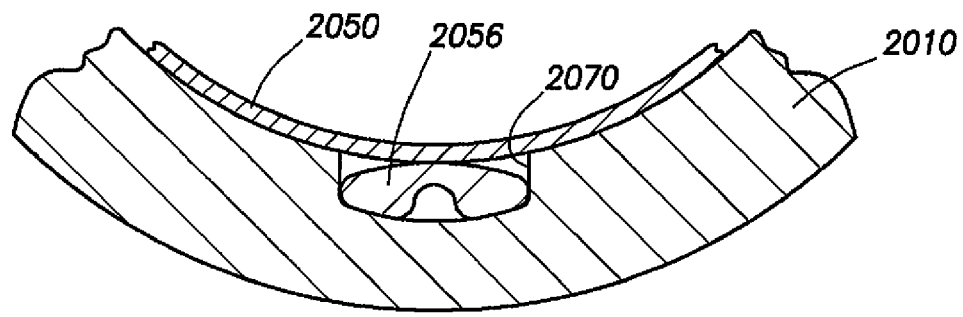
FIG.20B1
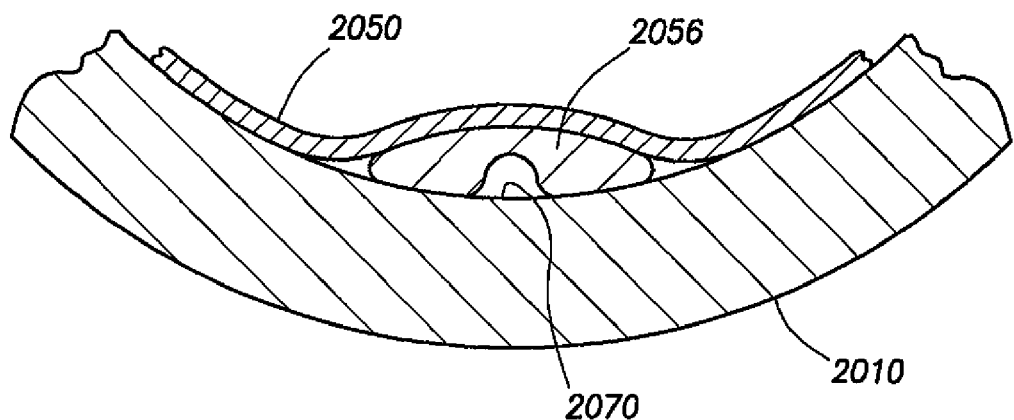
FIG.20B2
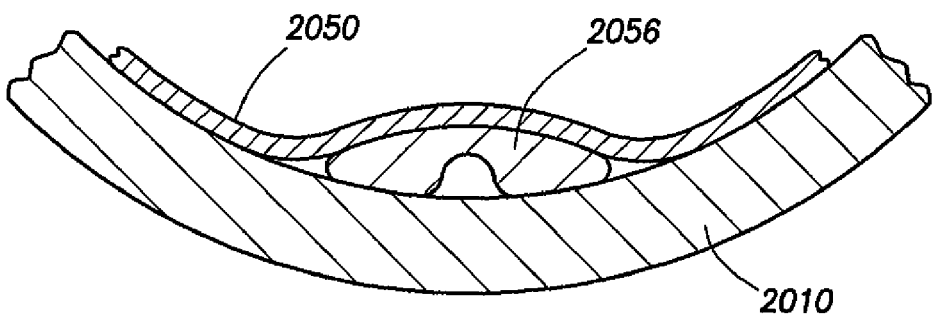
FIG.20C

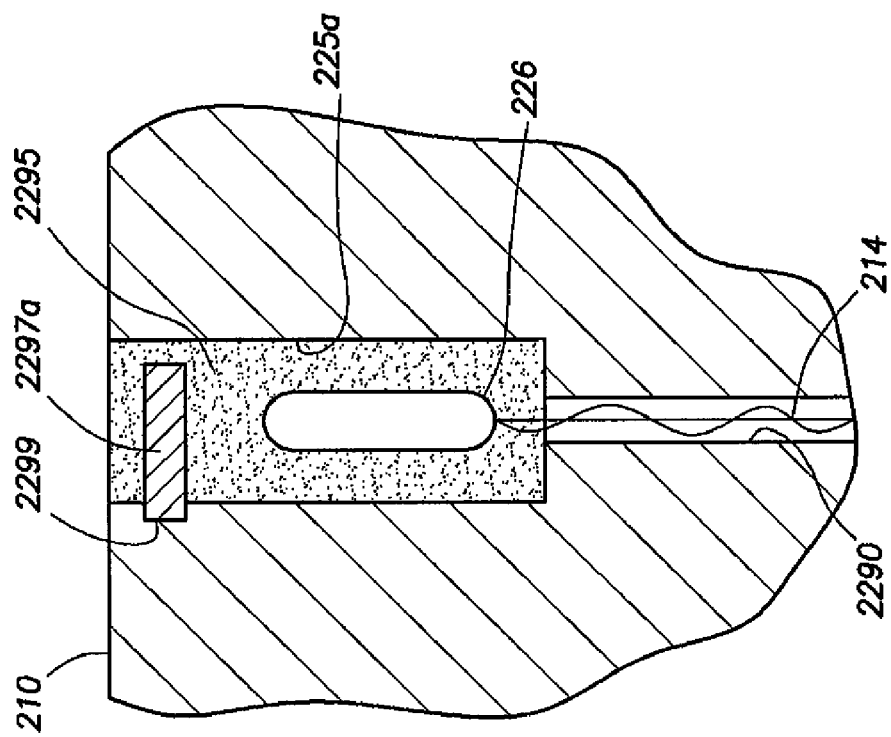
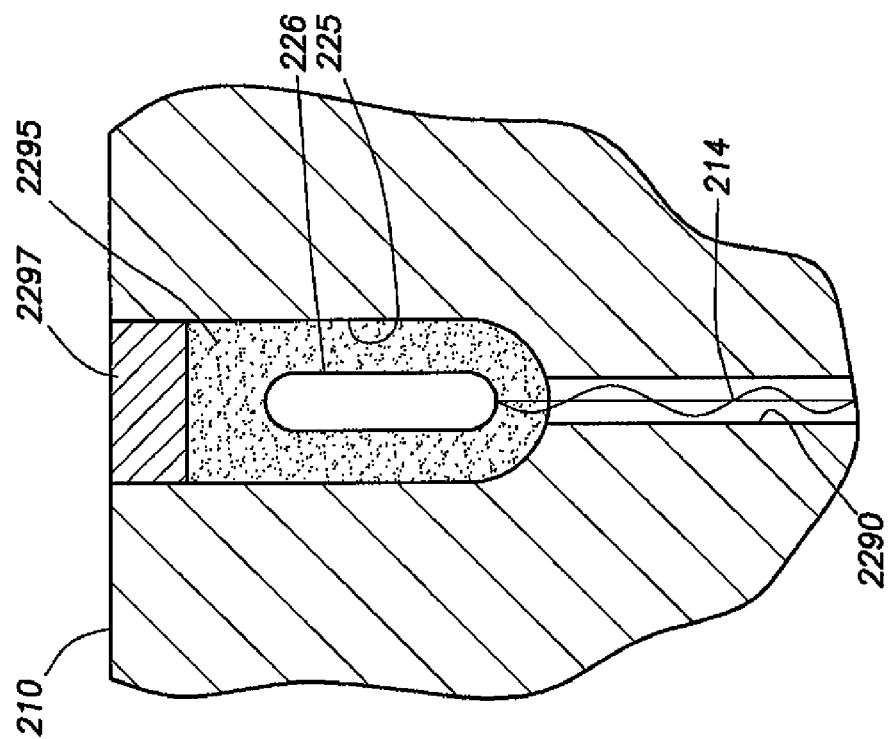
FIG.22A
FIG.22B

METHOD AND CONDUIT FOR TRANSMITTING SIGNALS

This application claims priority to U.S. Provisional Application No. 60/749,546, filed on Dec. 12, 2005 and titled "Method and Conduit for Transmitting Signals."

BACKGROUND OF THE INVENTION

1. Field of the Invention

The present invention relates to telemetry systems for use in wellbore operations. More particularly, the present invention relates to wellbore telemetry systems, such as wired drill pipe telemetry, for passing signals between a surface unit and a downhole tool positionable in a wellbore penetrating a subterranean formation.

2. Background of the Related Art

Wellbores are drilled to locate and produce hydrocarbons. A downhole drilling tool with a bit at and end thereof is advanced into the ground to form a wellbore. As the drilling tool is advanced, a drilling mud is pumped from a surface mud pit, through the drilling tool and out the drill bit to cool the drilling tool and carry away cuttings. The fluid exits the drill bit and flows back up to the surface for recirculation through the tool. The drilling mud is also used to form a mudcake to line the wellbore.

During the drilling operation, it is desirable to provide communication between the surface and the downhole tool. Wellbore telemetry devices are typically used to allow, for example, power, command and/or communication signals to pass between a surface unit and the downhole tool. These signals are used to control and/or power the operation of the downhole tool and send downhole information to the surface.

Several different types of telemetry systems have been developed to pass signals between the surface unit and the downhole tool. For example, mud pulse telemetry systems use variations in the flow of mud passing from a mud pit to a downhole tool and back to the surface to send decodable signals. Examples of such mud pulse telemetry tools may be found in U.S. Pat. Nos. 5,375,098 and 5,517,464. In addition to mud pulse wellbore telemetry systems, other wellbore telemetry systems may be used to establish the desired communication capabilities. Examples of such systems may include a drill pipe wellbore telemetry system as described in U.S. Pat. No. 6,641,434, an electromagnetic wellbore telemetry system as described in U.S. Pat. No. 5,624,051, an acoustic wellbore telemetry system as described in PCT Patent Application No. WO2004085796. Other data conveyance or communication devices, such as transceivers coupled to sensors, have also be used transmit power and/or data. Depending on the wellbore conditions, data transmission rates and/or other factors, it may be preferable to use certain types of telemetry for certain operations.

In particular, drill pipe telemetry has been used to provide a wired communication link between a surface unit and the downhole tool. The concept of routing a wire in interconnected drill pipe joints has been proposed, for example, in U.S. Pat. No. 4,126,848 by Denison; U.S. Pat. No. 3,957,118 by Barry et al.; and U.S. Pat. No. 3,807,502 by Heilhecker et al.; and in publications such as "Four Different Systems Used for MWD", W. J. McDonald, The Oil and Gas Journal, pages 115-124, Apr. 3, 1978. A number of more recent patents and publication have focused on the use of current-coupled inductive couplers in wired drill pipe (WDP) as described, for example, in U.S. Pat. Nos. 4,605,268; 2,140,537 5,052,941; 4,806,928; 4,901,069; 5,531,592; 5,278,550; 5,971,072; 6,866,306 and 6,641,434; Russian Federation published Patent Application No. 2040691; and PCT Application No. WO 90/14497. A number of other patent references have disclosed or suggested particular solutions for data transmission along the axial lengths of downhole conduit or pipe joints, such as U.S. Pat. Nos. 2,000,716; 2,096,359; 4,095,865; 4,72,402; 4,953,636; 6,392,317; 6,799,632 and US 2004/0119607; and PCT Application Nos. WO 2004/033847 and WO 0206716. Some techniques have described a wire positioned in a tube and placed inside a drill collar as shown, for example, in U.S. Pat. No. 4,126,848.

Despite these advancements in wired drill pipe telemetry technology, there remains a need to provide a reliable telemetry system. It is desirable that such a system provide techniques for protecting electrical components. It is further desirable that such a system be easily manufactured, machined and/or modified. Such a system is preferably capable of one or more of the following, among others: reduced electrical faults and/or failures, good contact between adjacent pipes, redundant components, and/or back up systems.

DEFINITIONS

Certain terms are defined throughout this description as they are first used, while certain other terms used in this description are defined below.

"Communicative" means capable of conducting, inducting, carrying, or otherwise transmitting a signal.

"Communicative coupler" means a device or structure that serves to connect the respective ends of two adjacent tubular members, such as the threaded box/pin ends of adjacent pipe joints, through which a signal may be communicated.

"Communication link" means a plurality of communicatively-connected tubular members, such as interconnected WDP joints for conducting signals over a distance.

"Telemetry system" means at least one communication link plus other components such as a surface computer, MWD/LWD tools, communication subs, and/or routers, required for the measurement transmission, and indication/recordation of data acquired from or through a borehole.

"Wired link" means a pathway that is at least partially wired along or through a WDP joint for conducting signals.

"Wired drill pipe" or "WDP" means one or more tubular members—including drill pipe, drill collars, casing, tubing and other conduit—that are adapted for use in a drill string, with each tubular member comprising a wired link. Wired drill pipe may comprise a liner or lining, and may be expandable, among other variations.

SUMMARY OF THE INVENTION

The present invention relates to a wired drill pipe for a drill string of a downhole tool positioned in a wellbore penetrating a subterranean formation. The wired drill pipe includes a drill pipe, a cable and a wire retainer. The drill pipe has a slot at each end thereof. The slots are adapted to receive at least one transformer. The drill pipe has an inner surface defining a passage for the flow of mud therethrough. The cable extends from the transformer into the passage of the drill pipe. The wire retainer is positioned on the inner surface of the drill pipe. The wire retainer is adapted to secure the cable therein.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

FIG. 2 is a sectional illustration of a series of wired drill pipe having a wired conduit therein.

FIG. 4 is a detailed sectional illustration of the facing pair of communicative couplers of FIG. 3 locked together as part of an operational conduit string.

FIG. 8A is a sectional illustration of a conduit similar to that shown in FIG. 5, but employing an elongated pad in combination with an expandable tubular sleeve for securing and protecting one or more conductive wires.

FIG. 8B is a perspective illustration of the conduit of FIG. 5A, after the expandable tubular sleeve has been expanded into engagement with the elongated pad and the inner wall of the conduit.

FIG. 19B1 is a detailed sectional view of a portion of the conduit of FIG. 19A taken along line 19B1-19B1 and depicting a keyway.

FIG. 19B2 is a detailed sectional view of a portion of a conduit having an alternate keyway.

FIG. 19C is a detailed sectional view of a portion of the conduit of FIG. 19A taken along line 19C-19C.

FIG. 20B1 is a detailed sectional view of a portion of the conduit of FIG. 20A taken along line 20B1-20B1 and depicting a keyway.

FIG. 20B2 is a detailed sectional view of a portion of a conduit having without a keyway.

FIG. 20C is a detailed sectional view of a portion of the conduit of FIG. 20A taken along line 20C-20C.

FIGS. 22A-D depict detailed views of a portion of a conduit having a the transformer secured therein using various configurations of a slot by a transformer retainer.

DETAILED DESCRIPTION OF THE INVENTION

Figure 1:
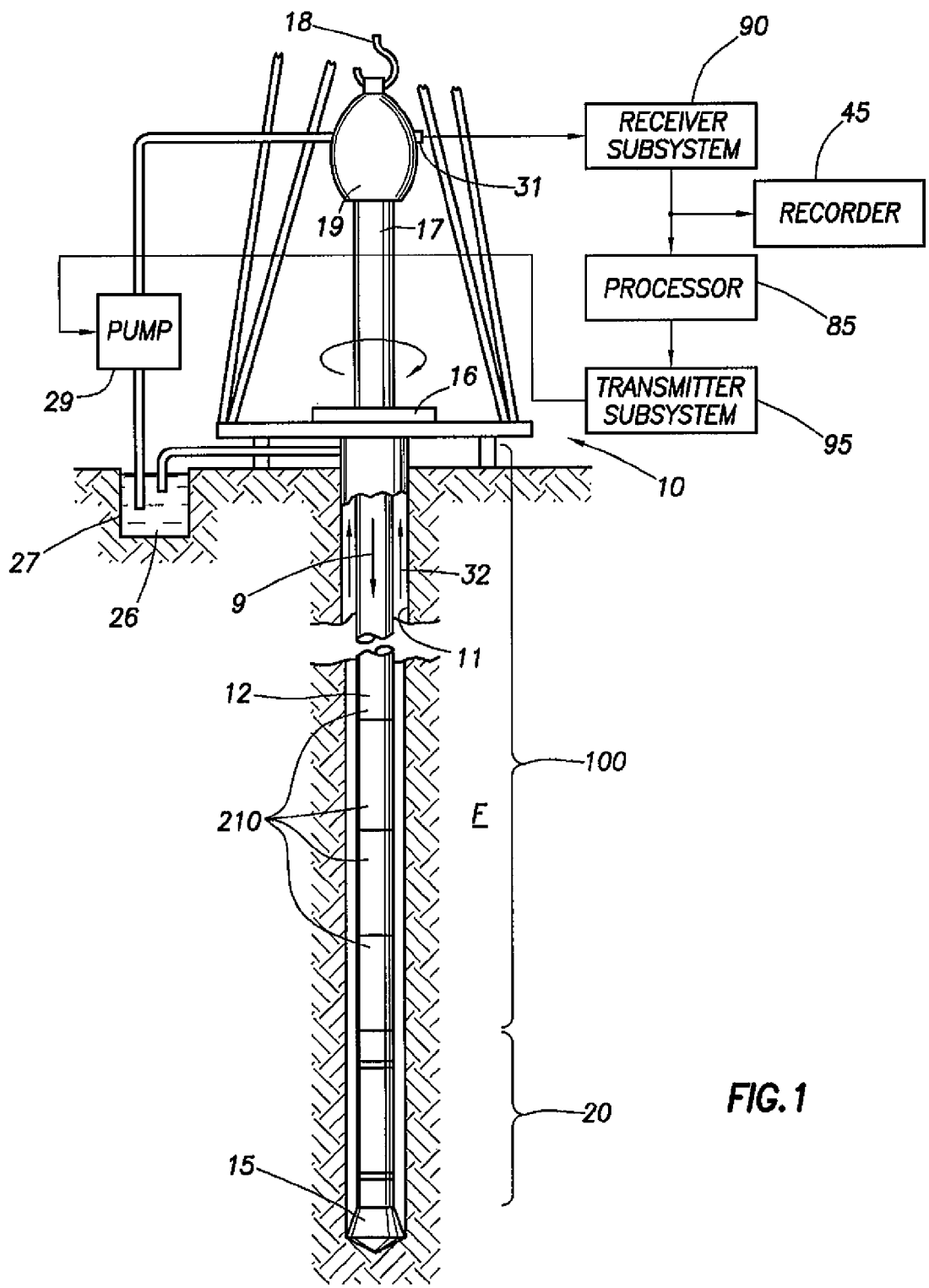
FIG. 1 is an schematic illustration of a wellsite including a rig having a downhole tool deployed therefrom into a wellbore via a drill string, the drill string having a plurality of wired drill pipe forming a drill string telemetry system.

FIG. 1 illustrates a conventional drilling rig and drill string in which the present invention can be utilized to advantage. As shown in FIG. 1, a platform and derrick assembly 10 is positioned over a borehole 11 penetrating a subsurface formation F. A drill string 12 is suspended within the borehole 11 and includes a drill bit 15 at its lower end. The drill string 12 is rotated by a rotary table 16, energized by means not shown, which engages a kelly 17 at the upper end of the drill string. The drill string 12 is suspended from a hook 18, attached to a traveling block (not shown), through the kelly 17 and a rotary swivel 19 which permits rotation of the drill string relative to the hook.

Drilling fluid or mud 26 is stored in a pit 27 formed at the well site. A mud pump 29 delivers drilling fluid 26 to the interior of the drill string 12 via a port (not numbered) in the swivel 19, inducing the drilling fluid to flow downwardly through the drill string 12 as indicated by directional arrow 9. The drilling fluid subsequently exits the drill string 12 via ports in the drill bit 15, and then circulates upwardly through the region between the outside of the drill string and the wall of the borehole, called the annulus, as indicated by direction arrows 32. In this manner, the drilling fluid lubricates the drill bit 15 and carries formation cuttings up to the surface as the drilling fluid is returned to the pit 27 for screening and recirculation.

The drill string 12 further includes a bottom hole assembly (BHA) 20 disposed near the drill bit 15. The BHA 20 may include capabilities for measuring, processing, and storing information, as well as for communicating with the surface (e.g., with MWD/LWD tools). An example of a communications apparatus that may be used in a BHA is described in detail in U.S. Pat. No. 5,339,037.

The communication signal from the BHA may be received at the surface by a transducer 31, which is coupled to an uphole receiving subsystem 90. The output of the receiving subsystem 90 is then coupled to a processor 85 and a recorder 45. The surface system may further include a transmitting system 95 for communicating with the downhole instruments. The communication link between the downhole instruments and the surface system may comprise, among other things, a drill string telemetry system 100 that comprises a plurality of wired drill pipe (WDP) joints 210.

The drill string 12 may otherwise employ a "top-drive" configuration (also well known) wherein a power swivel rotates the drill string instead of a kelly joint and rotary table. Those skilled in the art will also appreciate that "sliding" drilling operations may otherwise be conducted with the use of a well known Moineau-type mud motor that converts hydraulic energy from the drilling mud 26 pumped from the mud pit 27 down through the drill string 12 into torque for rotating a drill bit. Drilling may furthermore be conducted with so-called "rotary-steerable" systems which are known in the related art. The various aspects of the present invention are adapted for employment in each of these drilling configurations and are not limited to conventional rotary drilling operations.

The drill string 12 employs a wired telemetry system wherein a plurality of WDP joints 210 are interconnected within the drill string to form a communication link (not numbered). One type of WDP joint, as disclosed in U.S. Pat. No. 6,641,434 by Boyle et al. and assigned to the assignee of the present invention, the entire contents of which is hereby incorporated by reference, uses communicative couplers—particularly inductive couplers—to transmit signals across the WDP joints. An inductive coupler in the WDP joints, according to Boyle et al., comprises a transformer that has a toroidal core made of a high permeability, low loss material such as Supermalloy (which is a nickel-iron alloy processed for exceptionally high initial permeability and suitable for low level signal transformer applications). A winding, consisting of multiple turns of insulated wire, coils around the toroidal core to form a toroidal transformer. In one configuration, the toroidal transformer is potted in rubber or other insulating materials, and the assembled transformer is recessed into a groove located in the drill pipe connection.

Figure 3:
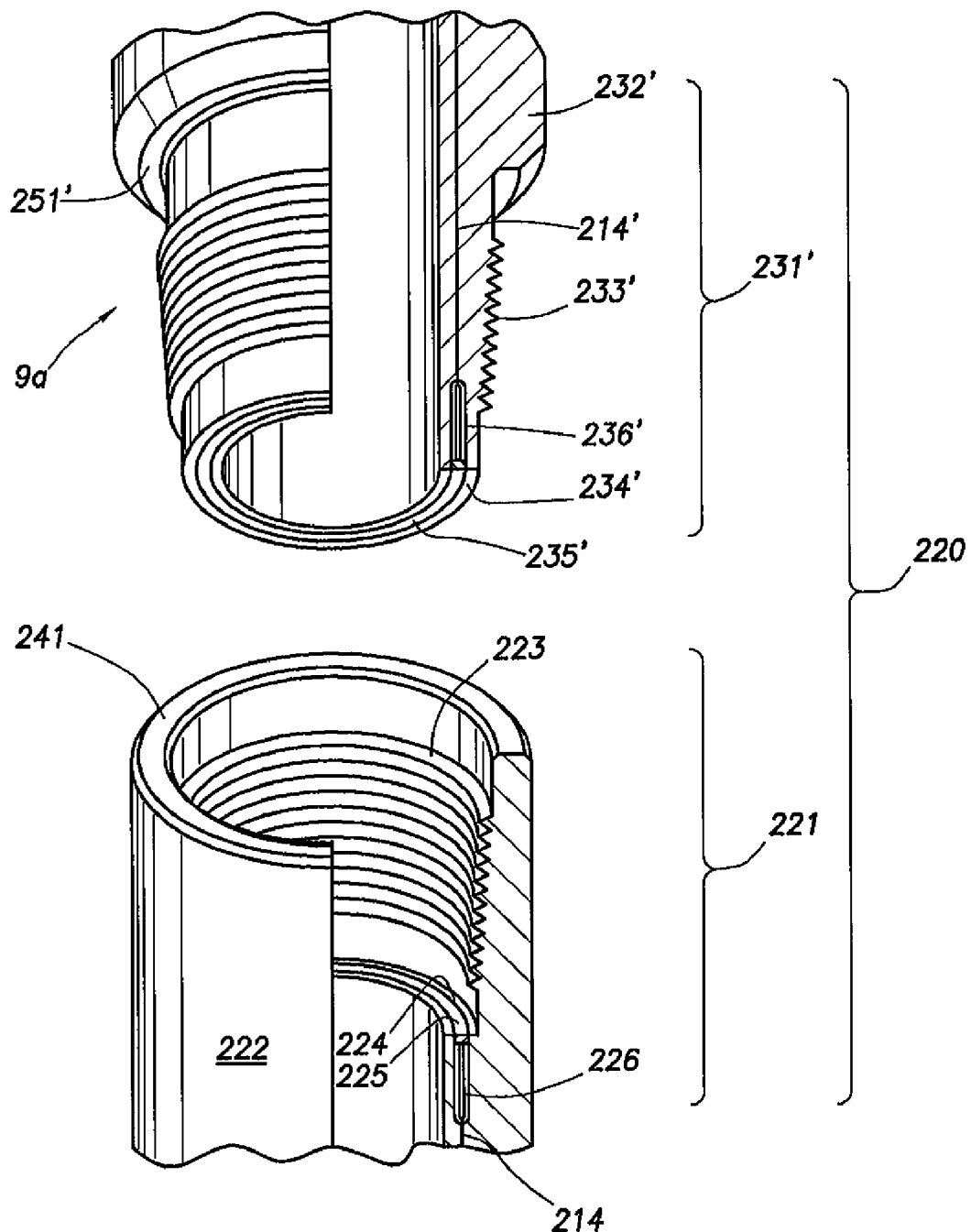
FIG. 3 is a partially cut-away, perspective illustration of a facing pair of communicative couplers according to the wired conduit of FIG. 2.

Turning now to FIGS. 2-4, a portion of the drill string 12 of FIG. 1 depicting a wired drill pipe (WDP) joint 210 adjacent WDP joints 9a and 9b. WDP joint 210 is shown to have communicative couplers 221, 231—particularly inductive coupler elements—at or near the respective end 241 of box end 222 and the end 234 of pin end 232 thereof. A first cable 214 extends through a conduit 213 to connect the communicative couplers, 221, 231 in a manner that is described further below.

The WDP joint 210 is equipped with an elongated tubular body 211 having an axial bore 212, a box end 222, a pin end 232, and a first cable 214 running from the box end 222 to the pin end 232. A first current-loop inductive coupler element 221 (e.g., a toroidal transformer) and a similar second current-loop inductive coupler element 231 are disposed at the box end 222 and the pin end 232, respectively.

The first current-loop inductive coupler element 221, the second current-loop inductive coupler element 231, and the first cable 214 collectively provide a communicative conduit across the length of each WDP joint. An inductive coupler (or communicative connection) 220 at the coupled interface between two WDP joints is shown as being constituted by a first inductive coupler element 221 from WDP joint 210 and a second current-loop inductive coupler element 231' from the next tubular member, which may be another WDP joint. Those skilled in the art will recognize that, in some embodiments of the present invention, the inductive coupler elements may be replaced with other communicative couplers serving a similar communicative function, such as, e.g., direct electrical-contact connections of the sort disclosed in U.S. Pat. No. 4,126,848 by Denison.

FIG. 4 depicts the inductive coupler or communicative connection 220 of FIG. 3 in greater detail. Box end 222 includes internal threads 223 and an annular inner contacting shoulder 224 having a first slot 225, in which a first toroidal transformer 226 is disposed. The toroidal transformer 226 is connected to the cable 214. Similarly, pin-end 232' of an adjacent wired tubular member (e.g., another WDP joint) includes external threads 233' and an annular inner contacting pipe end 234' having a second slot 235', in which a second toroidal transformer 236' is disposed. The second toroidal transformer 236' is connected to a second cable 214' of the adjacent tubular member 9a. As shown in FIG. 2, pin end 232' has an outer contacting shoulder 251' that contacts end 241 of box end 222.

The slots 225 and 235' may be clad with a high-conductivity, low-permeability material (e.g., copper) to enhance the efficiency of the inductive coupling. When the box end 222 of one WDP joint is assembled with the pin end 232' of the adjacent tubular member (e.g., another WDP joint), a communicative connection is formed. FIG. 4 thus shows a cross section of a portion of the resulting interface, in which a facing pair of inductive coupler elements (i.e., toroidal transformers 226, 236') are locked together to form a communicative connection within an operative communication link. This cross-sectional view also shows that the closed toroidal paths 240 and 240' enclose the toroidal transformers 226 and 236', respectively, and that the conduits 213 and 213' form passages for internal electrical cables 214 and 214' that connect the two inductive coupler elements disposed at the two ends of each WDP joint.

The above-described inductive couplers incorporate an electric coupler made with a dual toroid. The dual-toroidal coupler uses inner shoulders of the pin and box ends as electrical contacts. The inner shoulders are brought into engagement under extreme pressure as the pin and box ends are made up, assuring electrical continuity between the pin and the box ends. Currents are induced in the metal of the connection by means of toroidal transformers placed in slots. At a given frequency (for example 100 kHz), these currents are confined to the surface of the slots by skin depth effects. The pin and the box ends constitute the secondary circuits of the respective transformers, and the two secondary circuits are connected back to back via the mating inner shoulder surfaces.

While FIGS. 2-4 depict certain communicative coupler types, it will be appreciated by one of skill in the art that a variety of couplers may be used for communication of a signal across interconnected tubular members. For example, such systems may involve magnetic couplers, such as those described in International Patent Application No. WO 02/06716 to Hall et al. Other systems and/or couplers are also envisioned.

Figure 5A:
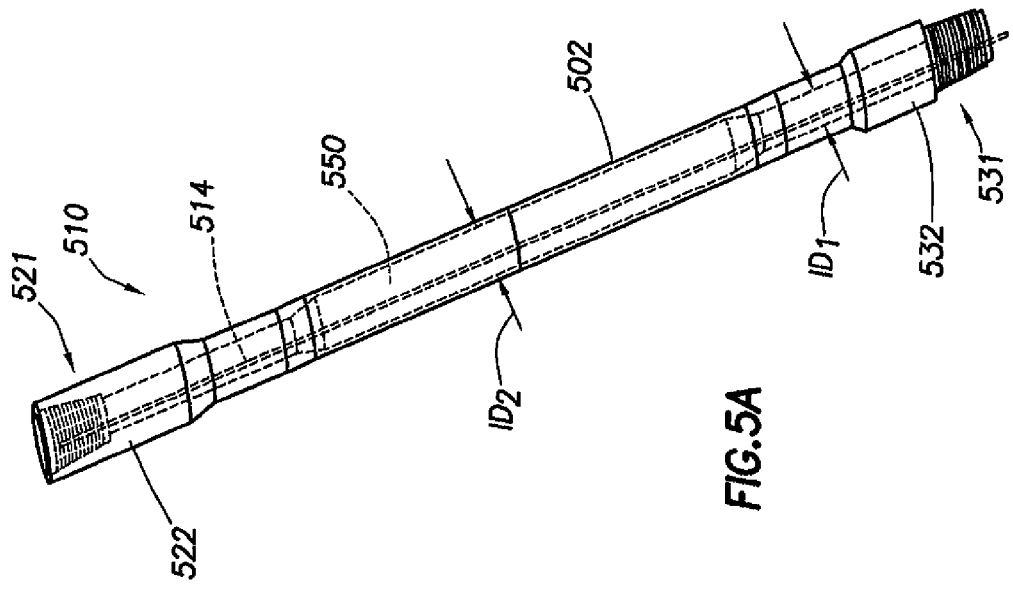
FIG. 5A illustrates a conduit similar to that shown in FIG. 2, but employing an expandable tubular sleeve for securing and protecting one or more conductive wires between a pair of communicative couplers.

FIGS. 5A-21B depict various wire retainer techniques for positioning and protecting a conductive wire or cable, such as the electric cable 214 and/or 214' of FIGS. 2-4, of in a WDP joint or conduit. FIG. 5A illustrates a conduit 510 similar to the WDP joint shown in FIG. 2. Accordingly, conduit 510 is defined by a tubular body 502 equipped with a pair of communicative couplers 521, 531 (which may be similar to the couplers 221 and 231 of FIGS. 2-4) at or near the respective box and pin ends 522, 532 of the tubular body.

Conduit intended for downhole use, such as alloy steel drill pipe, typically consists of a straight pipe section (see tubular body 502) with a lower pin connection (see pin end 532) and an upper box connection (see box end 522). In the case of a standard drill pipe, the inner diameter (ID) preferably varies such that the smallest ID lies at the end connections (see $ID_1$) and the largest ID lies along the mid-axial portion of the pipe body (see $ID_2$). Typical differences between the end connection IDs and the pipe body IDs are 0.5 to 0.75 inches, but may be larger in some cases (e.g., 1.25 inches or more). It will be appreciated, however, that other downhole conduits (even some drill pipe) do not exhibit such a tapered ID but instead employ a constant ID through the end connections and the body. One example of a constant-ID drill pipe is Grant Prideco's HiTorque™ drill pipe. The present invention is adaptive to downhole conduits having numerous (varied or constant) ID configurations.

The communicative couplers 521, 531 may be inductive coupler elements that each include a toroidal transformer (not shown), and are connected by one or more conductive wires 514 (also referred to herein simply as a "cable") for transmitting signals therebetween. The cable ends are typically routed through the "upset" ends of the conduit by way of a "gundrilled" hole or machined groove in each of the upset ends so as to reach, e.g., the respective toroidal transformers. Thus, the communicative couplers 521, 531 and the cable 514 collectively provide a communicative link along each conduit 510 (e.g., along each WDP joint).

Preferably, the conduit 510 is configured to secure and protect the electrically-conductive wires or pair of conductive wires (also known as conductors), such as cable 514, that run from one end of a joint of conduit to the other. If only one conductive wire is used, the conduit itself may serve as a second conductor to complete a circuit. Typically, at least two conductive wires will be employed, such as a twisted wire pair or coaxial cable configuration. At least one of the conductors is typically electrically insulated from the other conductor(s). It may be desirable in some circumstances to use more than two conductors for redundancy or other purposes. Examples of such redundant wire routing are described below in reference to FIGS. 21A-B.

As shown in FIG. 5A, the conductor(s) are secured and protected by an expandable tubular sleeve 550 shown disposed (and expanded) within the tubular body 502. The sleeve 550 is designed so that it will fit in its unexpanded state within the narrowest diameter, $ID_1$, of the conduit 510. Thus, e.g., the expandable tubular sleeve 550 may be initially cylindrical in shape and exhibit an outer diameter (OD) that is slightly narrower than the conduit ID at $ID_1$. It will be appreciated that the expandable tubular sleeve need not be initially cylindrical, and various configurations may be employed (e.g., U-shaped as described below) to advantage.

In particular embodiments, the expandable tubular sleeve has a portion that is predisposed to initiate expansion thereof under the application of internal fluid pressure, such as gas or fluid pressure, and particularly by way of hydroforming (described further below). When a sleeve such as sleeve 550 is disposed in a conduit 510, a cable 514—having been connected between the communicative couplers 521, 531 so as to establish a wired link—extends along the conduit's tubular body 502 between the inner wall of the tubular body and the (unexpanded) tubular sleeve 550. The tubular sleeve 550 is then expanded within the tubular body 502 by applying fluid pressure to the inner wall of the tubular sleeve, and the expansion is initiated at a predetermined location (e.g., at or near the center of the body 502). Such expansion has the effect of reliably securing the cable 514 between the tubular body 502 and the tubular sleeve 550.

Figure 5B:
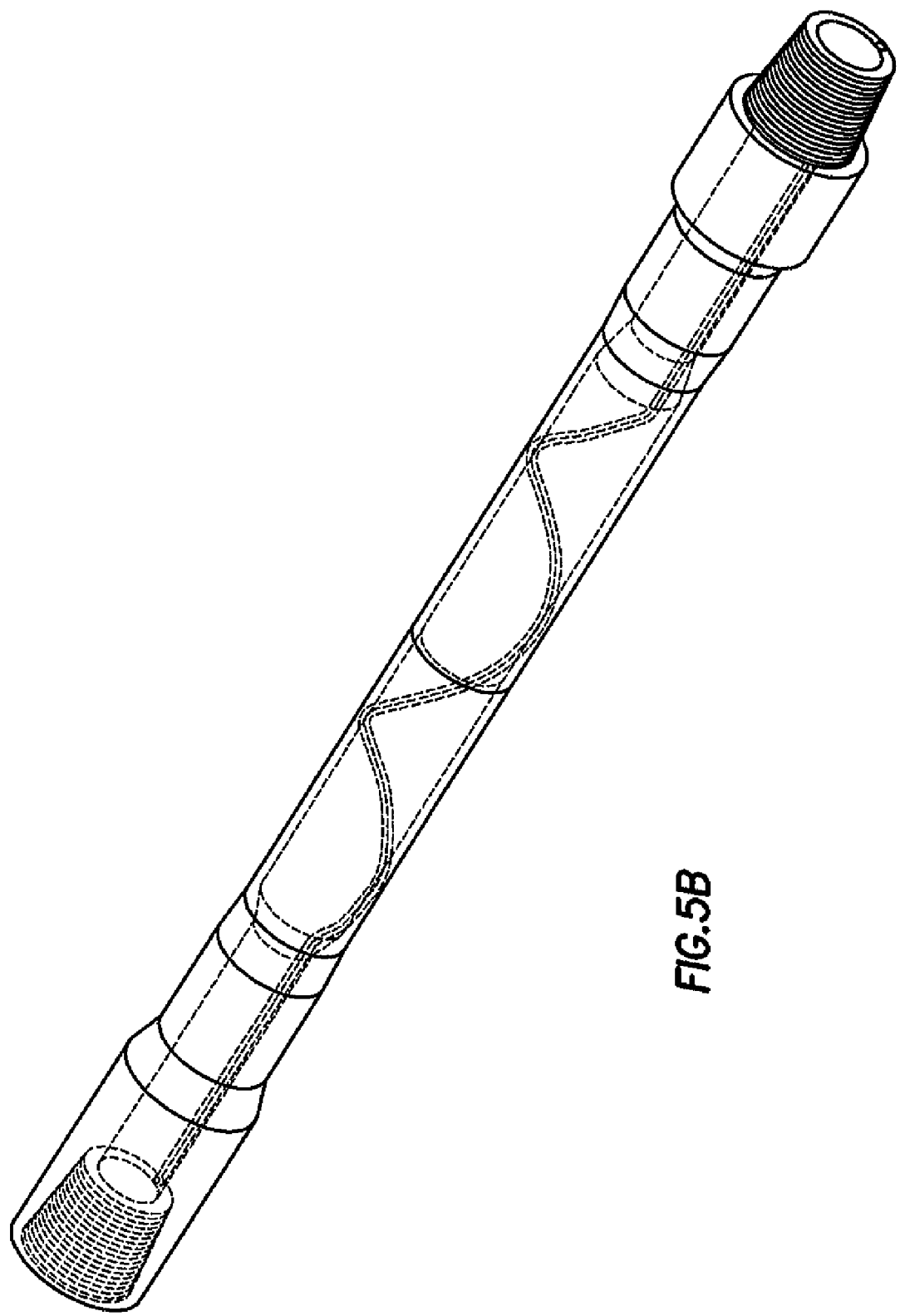
FIG. 5B illustrates a conduit similar to that shown in FIG. 5A, except that the conductive wire(s) extends helically through the conduit.
Figure 11C:
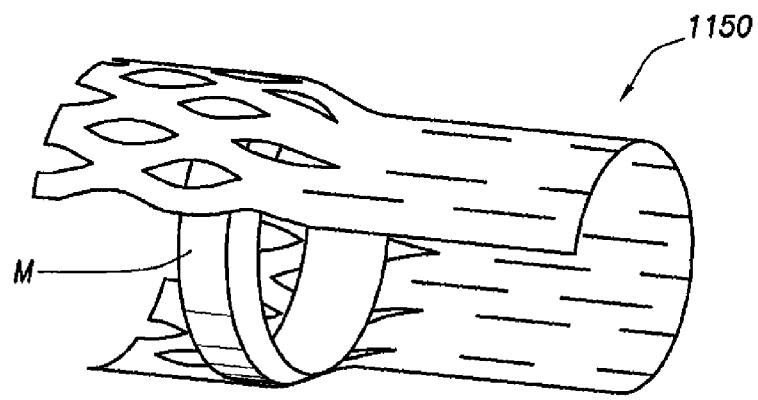
FIG. 11C shows a mandrel being used to mechanically expand the sleeve of FIG. 11A.
Figure 6A:
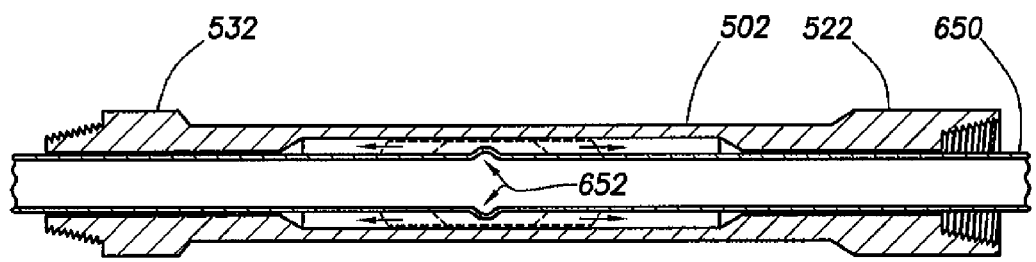
FIGS. 6A-6D illustrate various means of preforming the expandable sleeve of FIG. 5, so as to predispose a portion of the sleeve to initiate expansion thereof under the application of internal fluid pressure such as by hydroforming.
Figure 6B:
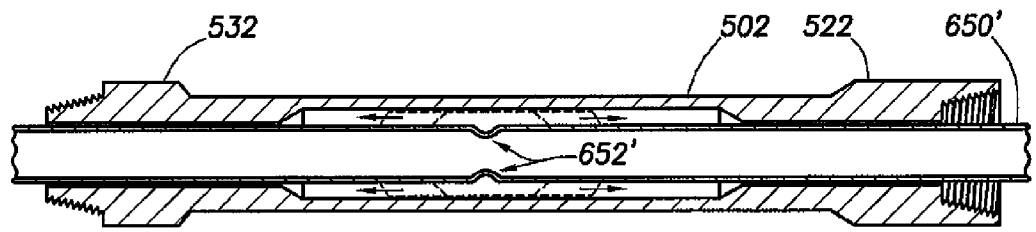
Figure 6C:
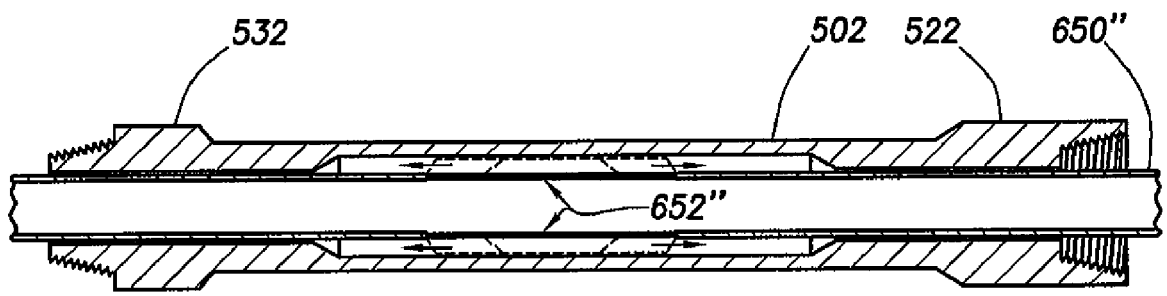
Figure 6D:
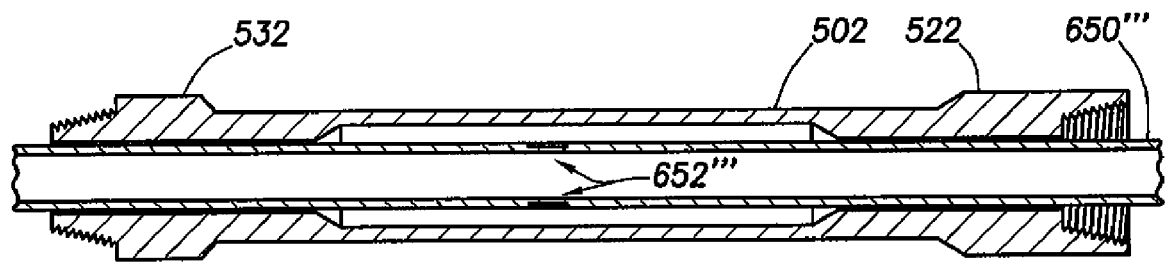

As shown in FIG. 5A, the cable 514 extends linearly along the length of the conduit's tubular body 502. However, as shown in FIG. 5B, the cable 514 may be positioned about the conduit 510 in any configuration, for example helically as shown. As will be further described herein, the wire may be secured in place using a variety of techniques. Examples of such techniques of hydroforming, welding, bonding and/or otherwise securing the cable in place are shown in FIGS. 6A-22B.

FIGS. 6A-6D illustrate various means of preforming (i.e., forming prior to positioning the tubular sleeve within the tubular conduit body) an expandable sleeve like sleeve 550 of FIG. 5, so as to predispose a portion of the sleeve to initiate expansion thereof under the application of internal fluid pressure. The predisposed portion of the tubular sleeve may be preformed by localized application of mechanical force to the inner wall of the tubular sleeve (see expanded annular portion 652 of sleeve 650 in FIG. 6A); localized application of mechanical force to the outer wall of the tubular sleeve (see contracted annular portion 652' of sleeve 650' in FIG. 6B); reducing the wall thickness of a portion of the tubular sleeve (see thinned annular portion 652''' of sleeve 650'' in FIG. 6C); selectively reinforcing the tubular sleeve (see unreinforced annular portion 652''' of sleeve 650''' in FIG. 6D); modifying the material properties of a portion of the tubular sleeve (e.g., by localized heat treatment—not illustrated); and/or a combination of these.

A particular method of expanding the expandable tubular sleeve within a conduit such as a drill pipe uses high-pressure water in a known process called hydroforming, a hydraulic three-dimensional expansion process that may be conducted at ambient temperature to secure the sleeve within a conduit. The tubular body of the conduit may be held in a closed die assembly while the sleeve—disposed within the conduit—is charged with high-pressure (e.g., 5000-10,000 psig) hydraulic fluid such as water. A hydroforming setup may consist, e.g., of a plurality of sealing pistons and hydraulic pumps, as is generally known in the art. It may be desirable to axially feed the sleeve by applying a compressive pushing force (proportional to the hydraulic pressure, e.g., several thousand psig) to the ends while hydraulic pressure is applied to the ID of the sleeve.

The hydroforming process causes plastic expansion of the sleeve until the sleeve engages and conforms to the inner profile of the conduit (see, e.g., sleeve 550 within the ID of conduit body 502 of FIG. 5). Special metal-forming lubricants may be used to minimize friction between sleeve OD and conduit ID. Once the hydraulic expansion is completed, excess sleeve material that extends axially beyond the two conduit ends may be trimmed to length.

Upon removal of the internal hydraulic pressure, the sleeve elastically contracts slightly within the conduit, thus leaving a small annular gap between the sleeve and the ID of the conduit. This gap may be filled with a polymer such as epoxy using a known vacuum-fill process. It could also be filled with a corrosion inhibitor such as a resin and/or a lubricant (e.g., oil or grease). The filler material is used to minimize the invasion of corrosive fluid into the annular gap, and to minimize any relative movement of the sleeve inside the conduit.

The expandable tubular sleeve may have a thin-walled tubular body made of a metal or polymer, and exhibits a diameter slightly less than the smallest drill pipe ID to facilitate insertion of the sleeve into the conduit. The cable extends between the sleeve and inner wall of the conduit. In some cases, such as with the use of a polymer sleeve, the cable may be embedded in the sleeve wall. With a metal sleeve, protective spacers (e.g., metal rods, or an elongated pad as described further below) are positioned near or about the cable to keep it from being crushed during expansion of the sleeve. In addition to protecting the cable, the expanded tubular sleeve may also protect the conduit (in particular, drill pipe) from corrosion, erosion, and other damage. The sleeve can in some cases eliminate the need for any drill pipe ID coating and therefore reduce overall cost.

One example of a drill pipe joint exhibits a 3.00 inch ID at the end connections and a 4.276 inch ID in the mid-section of the tubular sleeve body. With this geometry, a metal tubular sleeve may expand from an initial OD of just under 3.00 inches to an OD of 4.276 inches in order to fit the ID profile of the drill pipe. This results in nearly 43% expansion, and suggests the use of a ductile tubing material such as a fully annealed 304 stainless steel conduit (3.00" OD×0.065" wall thickness) for hydroforming. Such a sleeve may also be expected to undergo substantial elongation (e.g., 55-60%) during hydroforming.

The goal in the hydro-forming process is to achieve a final state of strain (at all points in the tube) in definable safe zones with sufficient margins of safety. Appropriate experimentation will indicate the level of sleeve wall thinning and the resulting margins of safety that can be achieved in a hydroforming process.

Figure 7:
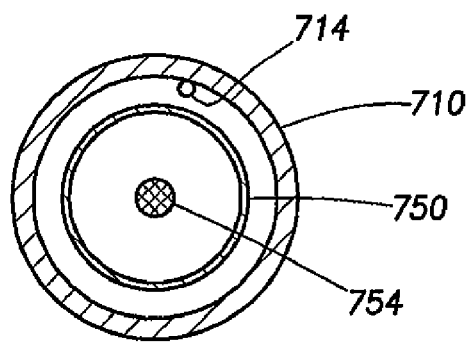
FIG. 7 illustrates an explosive being positioned within an expandable tubular sleeve like that of FIG. 5 for expanding the sleeve upon detonation.
Figure 10A:
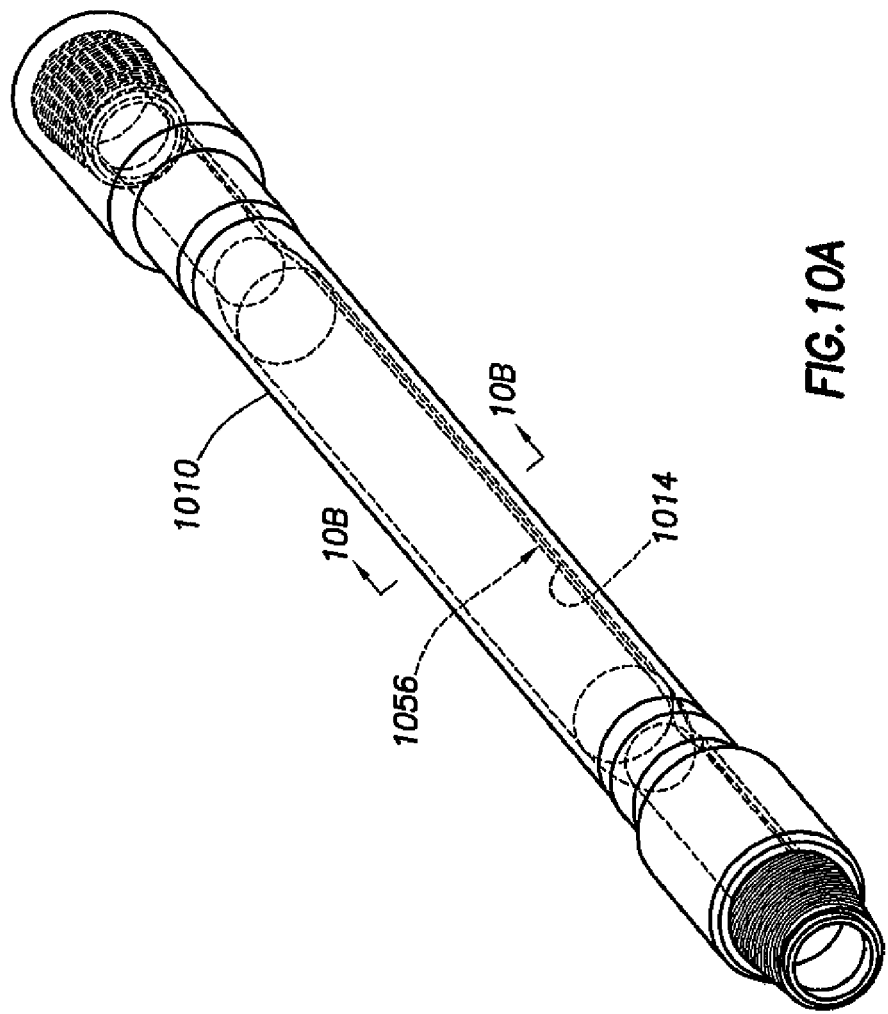
FIG. 10A illustrates a conduit similar to that shown in FIG. 5, but employing a welded, grooved elongated pad for securing one or more conductive wires.

With reference now to FIG. 7, another way of expanding a tubular sleeve, referenced as 750, to secure and protect a cable 714 within a conduit 710 employs an explosive charge 754. In a fashion similar to hydroforming, a relatively thin-walled sleeve 750 is placed inside a conduit such as drill pipe 710. Explosive charge(s) 754 are detonated inside the sleeve 750 causing it to rapidly expand and conform to the drill pipe ID. Metal spacers (not shown) may be employed to protect the cable 714 from damage during the explosion. Ideally, the sleeve will be metallurgically bonded to the drill pipe ID by the force of the explosive. However, to avoid damage to the cable 714, it may be sufficient that the sleeve be expanded using a relatively small amount of explosive so that the liner will not bond to the drill pipe ID, but will nearly conform to the ID in size and shape (i.e., leaving a narrow, annular gap). As with the hydroformed sleeve, a resin or other protective material may be placed between the sleeve 750 and drill pipe 712 to fill any voids and ensure corrosion protection.

FIG. 8A is a sectional illustrations of a conduit 810 similar to the conduit 510 shown in FIG. 5, but employing an elongated pad 856 in combination with an expandable tubular sleeve 850 for securing one or more conductive wires (also known as a cable) 814 in accordance with the present invention. FIG. 8B is a perspective illustration of the conduit 810 of FIG. 8A, after the expandable tubular sleeve 850 has been expanded into engagement with the elongated pad 856 and the inner wall of the conduit 810. The tubular body 802 of the conduit 810 is equipped with a pair of communicative couplers 821, 831 at or near the respective box and pin ends 822, 832 of the tubular body 802. The elongated pad 856 is positioned at or near an inner wall of the tubular body 802 so as to protect and secure the cable 814 extending between the communicative couplers 821, 831 against the inner wall of the tubular body 802, thereby establishing a secured wired link. The elongated pad may be metallic in construction, permitting it to be bent to fit the ID profile of the conduit 810. Keyway features (not shown) machined on the connection end IDs of the conduit may be used to secure the pad therein. It will be appreciated that the pad may be otherwise secured to the conduit inner wall, such as by application of a suitable adhesive. When secured in this manner, the pad is prevented from moving during the expansion of the tubular sleeve 850.

Figure 9A:
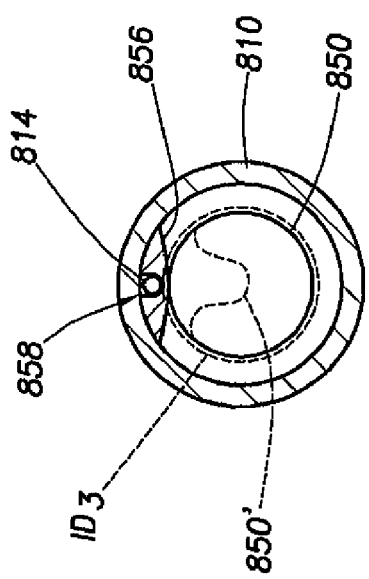
FIG. 9A is a cross-sectional illustration of the conduit of FIG. 8A, with an alternative U-shaped expandable tubular sleeve also being illustrated in dotted lines.

FIG. 9A is a cross-sectional illustration of the conduit 810 of FIG. 8A taken along line 9A-9A. The cylindrical expandable tubular sleeve 850 is shown in an unexpanded state, and an alternative U-shaped expandable tubular sleeve 850' is illustrated in dotted lines. The sleeve 850 initially has a circular cross-section, and its diameter is close to the final expanded diameter inside the conduit 810 at the time the sleeve is inserted into the conduit 810. The sleeve 850' is preformed into the U-shape by partially collapsing the sleeve. In either case, the sleeve (e.g., 850 or 850') will have an OD that is slightly less than the minimum ID (referenced as $ID_3$) at the end connections of the conduit 810.

Figure 9B:
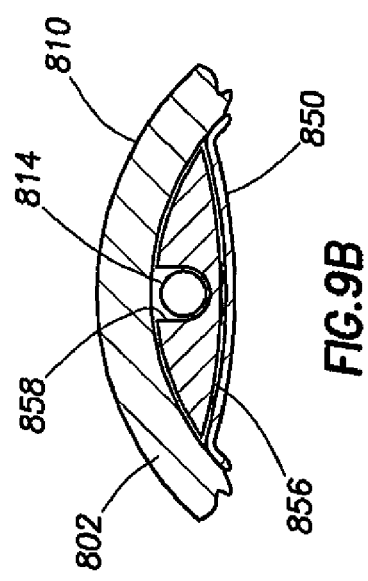
FIG. 9B is a detailed cross-sectional illustration of the conduit of FIG. 5B, wherein the sleeve has been expanded to engage the elongated pad and the inner wall of the conduit.

FIG. 9B is a detailed cross-sectional illustration of a portion of the conduit 810, wherein the sleeve 850 has been expanded to engage the elongated pad 856 and the inner wall of the conduit body 802. The expanded sleeve 850 along with the grooved metallic pad 856 secures the cable 814 that runs between the ends of the conduit (e.g., a drill pipe) 810 along the ID thereof. The groove 858 of the metallic pad 856 provides a smooth cable channel and protects the cable 814 from the expansion forces applied to the sleeve 850 as well as the downhole environment.

The tubular sleeve 850 may be expanded into engagement with the pad 856 and the conduit inner wall by applying fluid pressure to the inner wall of the sleeve (as described above in reference to the hydroforming of FIGS. 5-6), by mechanically applying force to the inner wall of the tubular sleeve (see FIG. 11C), or a combination of these steps. Additionally, the sleeve-expanding step may include detonating an explosive within the tubular sleeve so as to apply an explosive force to the inner wall of the tubular sleeve, as described above in reference to FIG. 7.

Figure 11A:
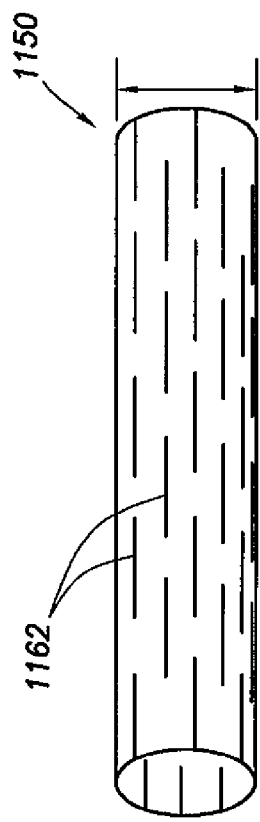
FIG. 11A shows an expandable tubular sleeve that is equipped with axially-oriented slots to facilitate expansion thereof.
Figure 11B:
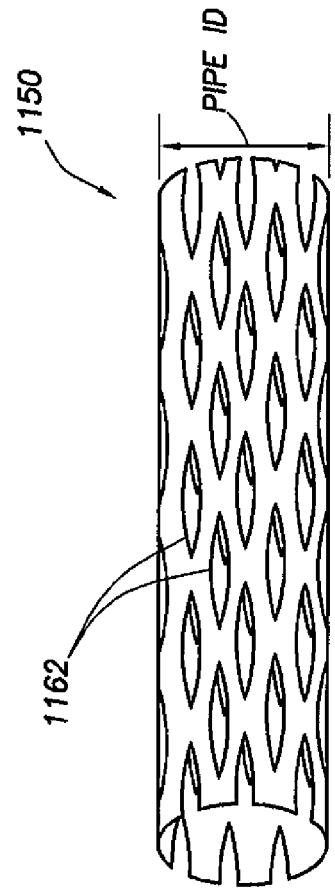
FIG. 11B shows the sleeve of FIG. 11A after expansion thereof.

FIGS. 11A-B illustrate the expandable tubular sleeve 1150 being equipped with a plurality of axially-oriented slots 1162 therein to facilitate expansion of the sleeve. Thus, the tubular sleeve 1150 is inserted into the drill pipe or other conduit with the slots 1162 closed, as illustrated in FIG. 11A. A mechanical or hydraulic mandrel M (see FIG. 11C) is used to expand the sleeve 1150, which opens the slots 1162 as shown in FIG. 11B.

Referring again to FIGS. 8-9, the shape of the elongated pad 856 substantially defines a cylindrical segment having an outer arcuate surface that complements the inner wall of the conduit body 802 (i.e., the elongated pad 856 is crescent-shaped) to reduce the maximum strain experienced in the sleeve 850. An elongated groove 858 is formed in the outer arcuate surface of the pad 856 for receiving the one or more conductive wires (i.e., a cable) 814. As mentioned above, the pad 856 is secured to the ID of the conduit 810 prior to expansion of the sleeve 850, such as by gluing the pad 856 to the conduit inner wall to ensure that it won't move during expansion of the sleeve. In the case of a metallic pad, however, the pad may be pre-formed to conform to the ID profile of the conduit (e.g., drill pipe), which also tends to keep the pad in place during the sleeve expansion process. The conduit 810 may employ a slot/keyway feature (not shown) on its ID at or near the end connections to route the cable 814 from the wire channel 858 of the pad 856 to gun-drilled openings or grooves (not shown) at the conduit ends 822, 832.

With reference now to FIGS. 100A-B, it will be appreciated that an elongated pad such as pad 1056 may be substantially metallic, polymeric, composite, fiberglass, ceramic, or a combination thereof. In particular embodiments wherein the pad is metallic, the pad 1056 may be secured to the inner wall of the conduit 1010 by welding the pad thereto at one or more locations 1055 (see FIG. 10B) along the pad 1056. In such a welded configuration, no expandable sleeve is needed to secure/protect the pad 1056 within the conduit 1010. The pad 1056 may be attached to the conduit inner wall by intermittent (e.g., tac-weld) or continuous welds. The pad may be configured in various ways, such as a helix, a straight line or sinusoidal undulations. A robotic welding fixture could be used to reach, e.g., the middle of a thirty foot joint of drill pipe. The drill pipe's (or other conduit's) inner wall is employed as part of the wire passageway, effectively increasing the diametric clearance of the drill pipe and possibly reducing problems with erosion, mudflow pressure drop and obstruction to logging tools, etc. This design thus employs a grooved metallic pad or strip that follows the ID profile of a drill pipe. Wires installed in this grooved metallic strip are routed to grooves at the respective conduit ends through holes drilled in the end connections.

Figure 12:
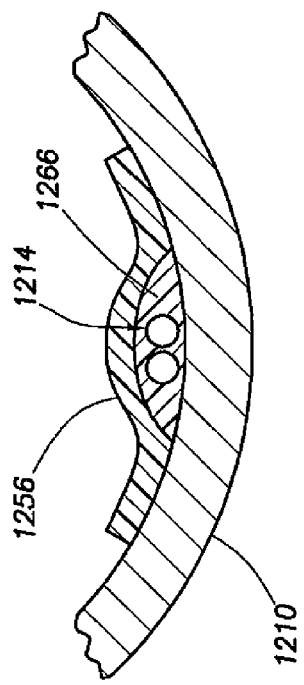
FIG. 12 is a detailed cross-sectional illustration similar to that of FIG. 9B, but wherein an elongated pad is employed independently of an expandable tubular sleeve and is bonded to the inner wall of a conduit.
Figure 10B:
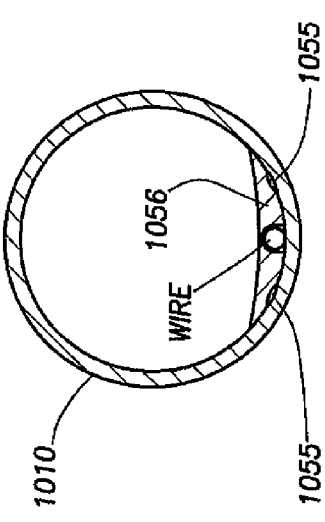
FIG. 10B is a cross-sectional illustration of the conduit of FIG. 10A, taken along section line 10B-10B of FIG. 10A.

In further embodiments wherein the pad is fiberglass, as illustrated by pad 1256 in FIG. 12, the pad is secured to the conduit 1210 by bonding the pad 1256 to the inner wall of the conduit's tubular body with an epoxy 1266 such as that commonly applied for corrosion protection. Additionally, the one or more conductive wires that make up the cable 1214 may be bonded to the inner wall of the tubular body, e.g., using the same epoxy 1266. The fiberglass pad 1256 aids adherence of the cable 1214 by providing a porous fabric to maximize contact area with the epoxy and ensure a reliable bond. The fiberglass pad also protects the cable from erosion, abrasion and other mechanical damage, even if the epoxy coating chips off.

Figure 13A:
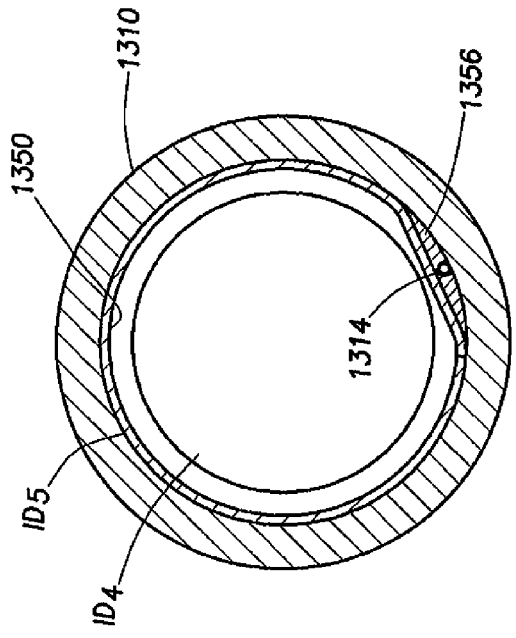
FIGS. 13A-B are cross-sectional illustrations of an alternative expandable tubular sleeve, in respective contracted and expanded states, employed to secure an elongated pad.
Figure 13B:
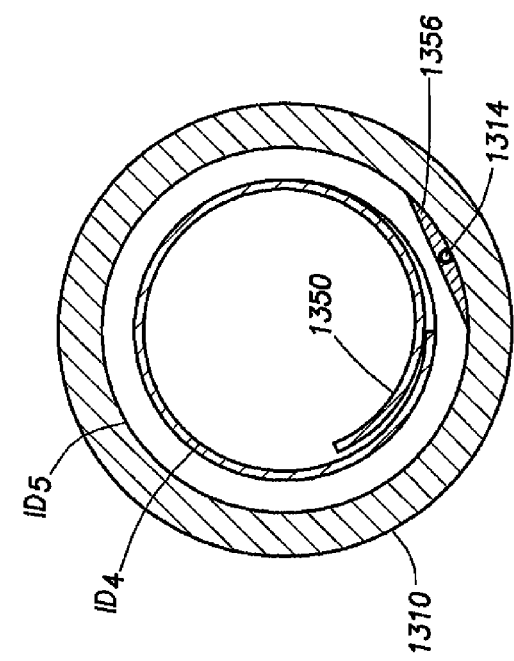

FIGS. 13A-B are cross-sectional illustrations of an alternative expandable tubular sleeve 1350, in respective contracted and expanded states. The sleeve 1350 is employed to secure an elongated pad 1356 within a conduit 1310 in accordance with the present invention. The tubular sleeve 1350 is cut along its length (e.g., axially or spirally), with the tubular sleeve having a diameter before such cutting that prevents it from fitting within the smallest ID, referenced as $ID_4$, of the conduit 1310. A compressive force is applied to the cut tubular sleeve 1350 to radially collapse the tubular sleeve into a spiral shape so that it will fit within the minimum clearance $ID_4$ at the end connections of the tubular body of the conduit 1310. While the tubular sleeve 1350 is maintained in the collapsed state, it is positioned within the conduit 1310, as illustrated in FIG. 13A. Accordingly, the elongated pad 1356 is positioned between the conduit 1310 and the tubular sleeve 1350. The tubular sleeve 1350 is then released (and possibly forced open) from its collapsed state so that the tubular sleeve radially expands into engagement with the elongated pad 1356 and the tubular body of the conduit 1310, as illustrated in FIG. 13B. In this position, at least a portion of the sleeve 1350 will expand into the larger ID, referenced at $ID_5$, of the intermediate body portion of the conduit 1310. Support rings can be added to the interior of the opened tubular sleeve to provide additional strength, and may be tack-welded in place.

Figure 14A:
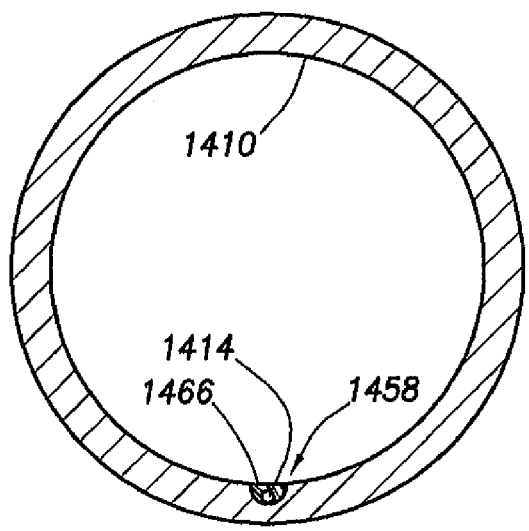
FIG. 14A is a cross-sectional illustration of a conduit employing a groove in its inner wall for securing one or more conductive wires.

FIG. 14A is a cross-sectional illustration of a conduit 1410 employing one or more inner grooves 1458 in its inner wall for protecting and securing a cable 1414. The conduit 1410 is equipped with a communicative coupler (not shown) at or near each of the two ends of the conduit's tubular body. The inner groove 1458 is formed in the inner wall of the conduit's tubular body by machining or, preferably, during the pipe extrusion process. The groove 1458 extends substantially between the conduit's communicative couplers. A cable 1414 having one or more conductive wires is extended through the groove 1458. The cable 1414 is connected between the communicative couplers, in a manner similar to that described above, so as to establish one or more wired links. The cable 1414 is secured within the inner groove 1458 by potting material 1466.

Figure 14B:
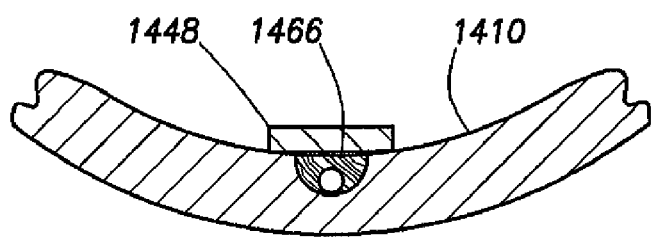
FIG. 14B illustrates the grooved conduit of FIG. 14A equipped with a cover plate.

The groove 1458 may otherwise include one or more plates 1448 bonded to the inner wall of the conduit tubular body, as shown in FIG. 14B, so as to cover each of the one or more grooves independently. The cover strip 1448 may be bonded to the drill pipe or other conduit 1410 using conventional welding methods or by explosive forming techniques. An epoxy coating is often applied to the pipe ID for corrosion protection, and may also serve to protect the wires in a groove. The cable 1414 may otherwise be secured by extending the cable through one or more small second conduits each bonded to or within one of the groove(s), with each second conduit being shaped and oriented so that it extends substantially between the communicative couplers (not shown in FIGS. 14A-B).

Figure 15:
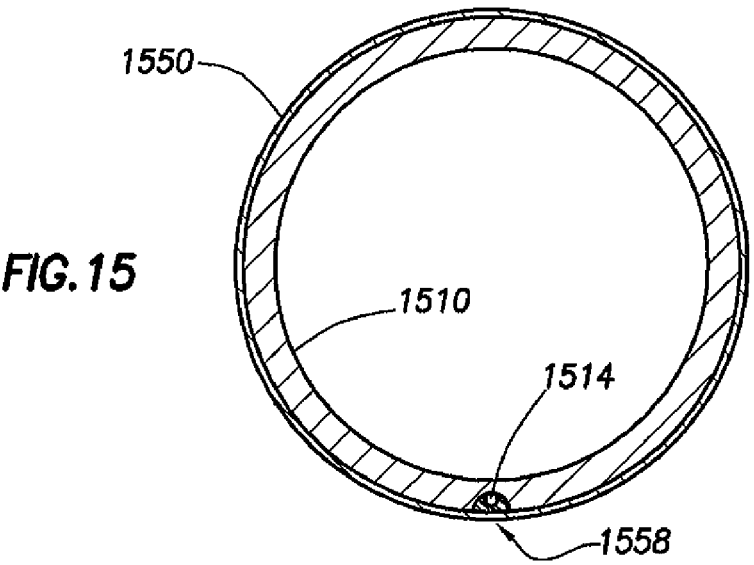
FIG. 15 is a cross-sectional illustration of a conduit employing a groove in its outer wall and an outer liner for securing one or more conductive wires.

FIG. 15 is a cross-sectional illustration of a conduit 1510 employing one or more grooves 1558 in its outer wall and an outer liner/sleeve 1550 for protecting and securing a cable 1514 having one or more conductive wires within the groove (s) 1558 in accordance with the present invention. The cable 1514 may be potted within the groove(s), and may otherwise be covered within the groove(s) such as by securing a sleeve 1550 about the outer wall of the conduit 1510, Such a sleeve 1550 may be one of metallic, polymeric, composite, fiberglass, ceramic or a combination thereof.

Figure 16A:
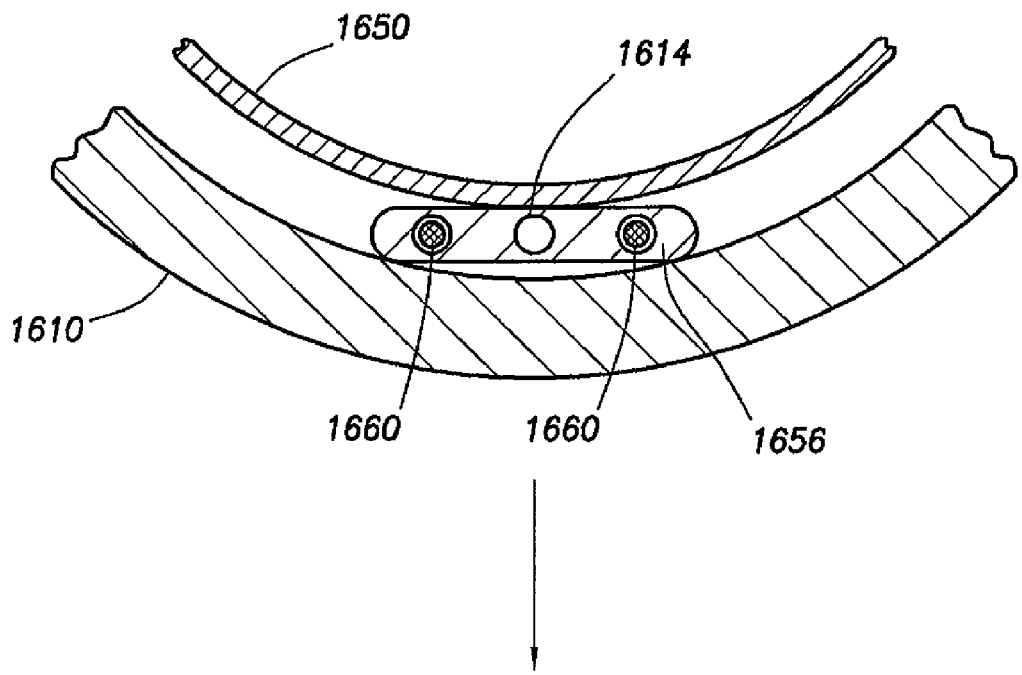
FIGS. 16A and 16B are detailed views of a portion of a conduit having a wire retainer in the unformed and formed position, respectively, the wire retainer being a pad.
Figure 16B:
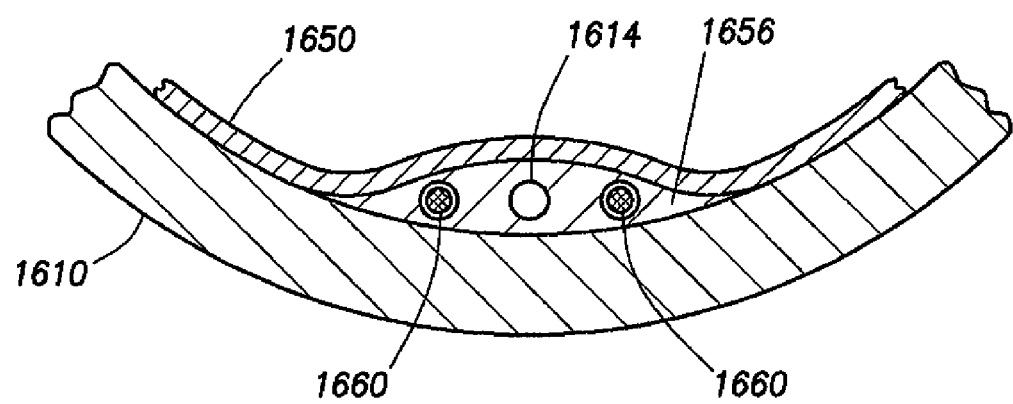

FIGS. 16A and 16B depict an alternate wire retainer. These Figs. depict an elongated pad 1656 in the unformed and formed position, respectively. The pad 1656 may be similar to the pad 856 of FIG. 9B, and positioned in the conduit using similar techniques. The pad 1656 may also be a preformed pad with the cable 1614 positioned therein. Additionally, the pad 1656 may be a pad that is made of a composite material that is adapted to deform to the desired shape as it is secured in the conduit 1610.

The pad 1656 of FIG. 16A is preferably an elliptical pad adapted to hold a cable 1614 in position within conduit 1610. The pad may be a composite material with the cable 1614 inserted therein. The pad may be a flexible composite strip positionable along the inner surface of the conduit.

The cable may be positioned in a hole extending through the composite material, or formed with the composite material. As shown, the pad may be provided with additional wires or fibers to support the pad and conduit. The wires, fibers and/or cables may be positioned within the composite using elastomer or plastic encapsulation.

The pad is positioned adjacent an inner surface of the conduit and secured therein. As shown, the pad may be hydroformed in place between a sleeve 1650 using the hydroforming techniques described herein. Alternatively, the pad may be adhered using welding, bonding or other techniques as described, for example, with respect to FIGS. 9A and 9B.

As shown in FIG. 16B, the pad may be formed of a composite material such that it deforms when hydroformed or pressed into place. Preferably, the pad deforms such that it achieves a filling shape that conforms to the shape of the pipe.

Figure 17A:
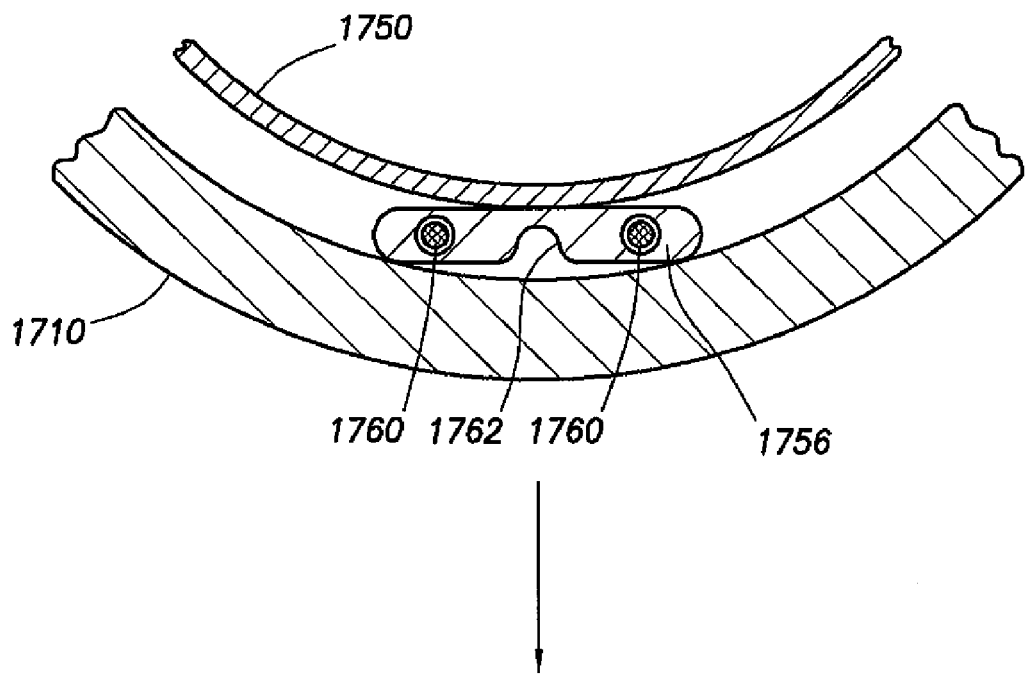
FIGS. 17A and 17B are detailed views of a portion of a conduit having a wire retainer in the unformed and formed position, respectively, the wire retainer being a pad with a groove.
Figure 17B:
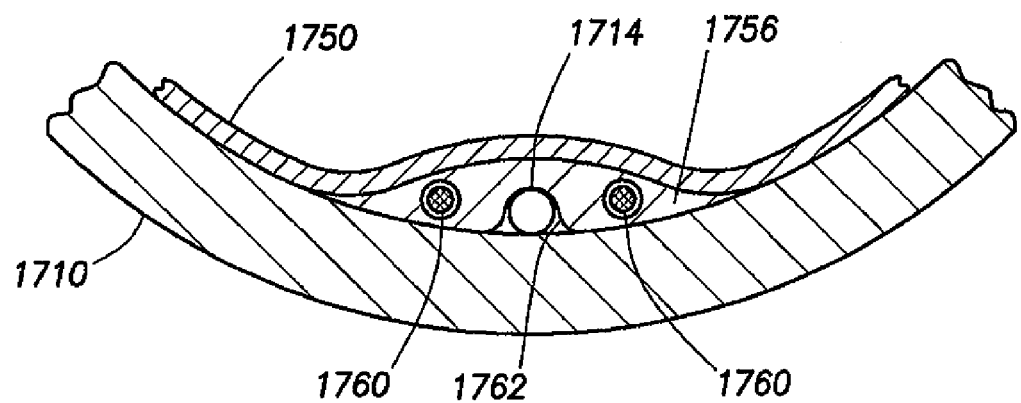

FIGS. 17A and 17B depict an alternate wire retainer. These Figs. depict an elongated pad 1756 in the unformed and formed position, respectively. The pad 1756 (with wires 1760 therein) is positioned between sleeve 1750 and conduit 1710 and secured therein. The pad 1756 may be similar to the pad 1656 of FIGS. 16A and 16B, except that the pad is further provided with a groove 1762. In this case, the cable 1714 remains separate from the pad. The cable may be positioned in the groove 1762 as the pad is positioned in place. Alternately, the cable may be threaded into the groove after the pad it placed against the inner surface of the drill collar.

Figure 18A:
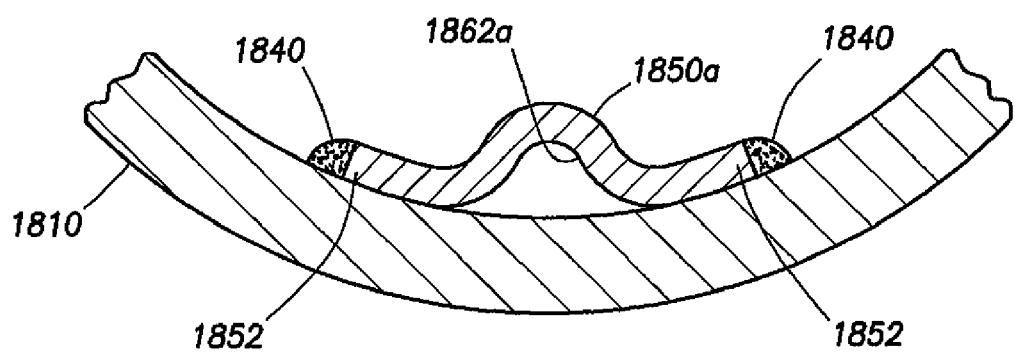
FIG. 18A is a detailed view of a portion of a conduit having a wire retainer, the wire retainer being a metal strip.
Figure 18B:
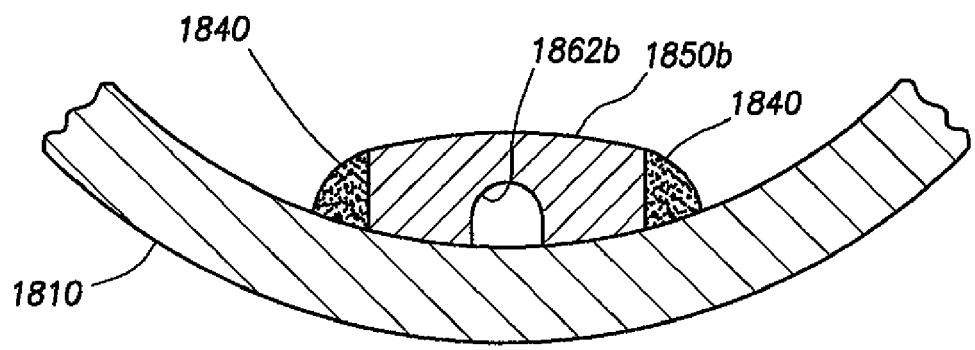
FIG. 18B is a detailed view of a portion of a conduit having a wire retainer, the wire retainer being a metal pad.

FIGS. 18A-B depict another alternate wire retainer. These Figs. depict metal retainers secured to the inner surface of conduit 1810 by a bond or weld 1840. The metal retainer of FIG. 18A is a metal strip 1850*a* is a convex strip having a groove 1862*a* between the strip and the conduit 1810. The strip may be a flat piece of metal bent or formed to form a groove 1862*a*. The strip 1862*a* preferably has ends 1852 secured to conduit 1810 via the welds 1840. The groove 1862*a* is adapted to receive a conduit.

The metal retainer 1850*b* of FIG. 18B is similar to the metal strip of FIG. 18A, except that it is a metal pad formed, for example, by cold extrusion. The shape of the pad is preferably conformed to the inner surface of conduit 1810 with a groove 1862*b* defined therebetween.

Figure 19A:
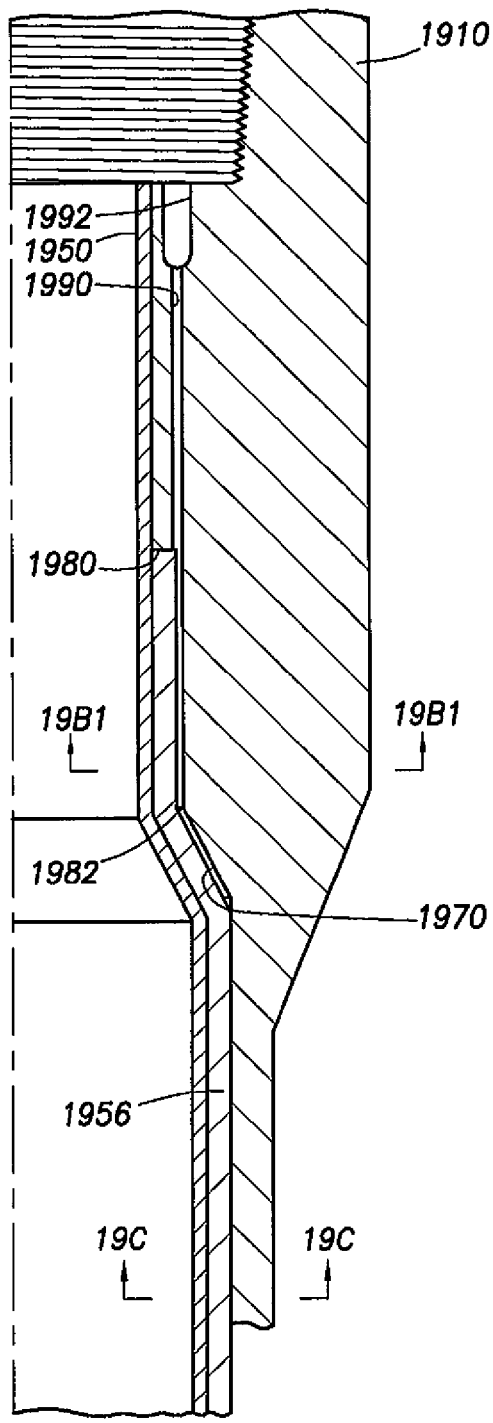
FIG. 19A is a longitudinal cross sectional view of a conduit depicting a keyway for receiving a wire retainer.
Figure 20A:
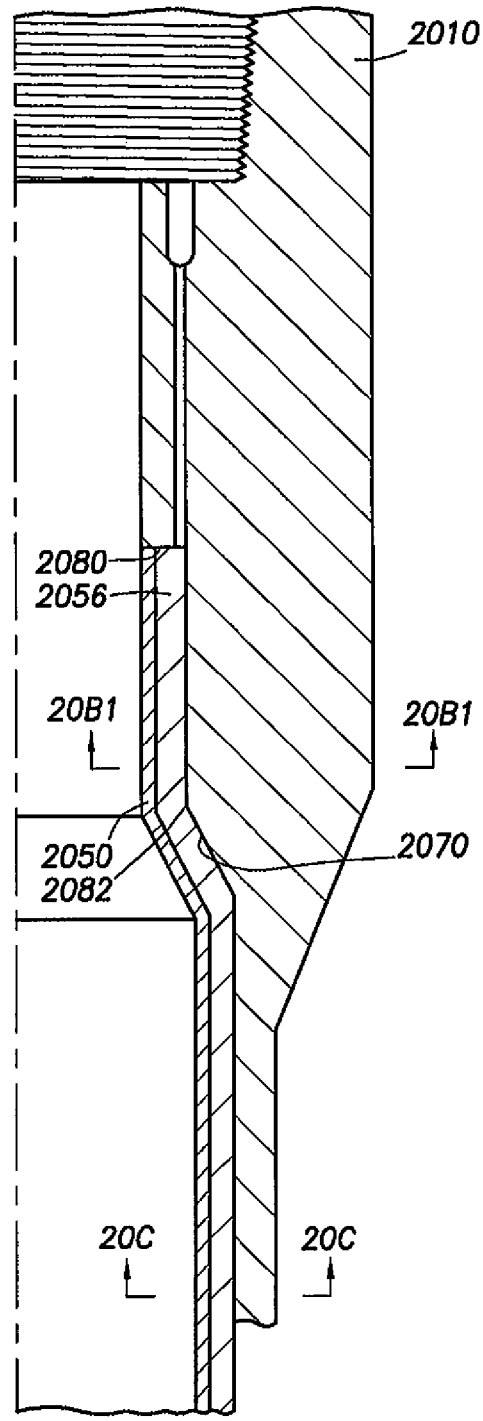
FIG. 20A is a longitudinal cross sectional view of a conduit depicting a keyway for receiving a wire retainer and a sleeve.

FIGS. 19A-20C depict conduits keyway techniques for positioning a sleeve and/or retaining a cable in a conduit. As shown in FIGS. 19A-C, the conduit has a keyway adapted to receive a wire retainer. As shown in FIGS. 20A-C, the conduit has a keyway adapted to receive a wire retainer and a sleeve. These figures depict configurations that may be used to optimize the inner diameter of the conduit.

FIG. 19A has a conduit 1910 with a keyway 1970 along an inner surface thereof. The keyway may be forged into the conduit when the conduit is formed. Alternatively, the keyway may be machined into an existing conduit.

The keyway extends linearly along the inner surface of the drill collar. The keyway is positioned near at least one end of the conduit to house a wire retainer. As shown, the keyway extends linearly along a portion of the inner surface of the drill collar. However, the keyway may extend over any distance and along any path. Preferably, the keyway is located at a position of the drill collar where the inner diameter of the conduit is reduced, to provide a space for the wire retainer (and or sleeve) may be placed to prevent further reduction of the inner diameter by the wire retainer and/or sleeve. As shown in FIG. 19A, the keyway extends from a shoulder 1980 of the drill collar to a position 1982 where the inner diameter changes.

The keyway is positioned adjacent a wire channel 1990 to define a continuous conduit path. In this configuration, a coupler may be positioned in groove 1992 with the cable (not shown) extending from the coupler, through the wire channel and to the wire retainer 1950. The pad 1950 may be the same as any of the wire retainers of, for example, FIGS. 16A-18C. Sleeve 1950 may be positioned about the pad to secure the wire retainer in place.

FIG. 19B1 is a cross sectional view of a portion of the conduit 1910 of FIG. 19A taken along line 19B1-19B1. As shown in FIG. 19B1, the keyway 1970 is adapted to receive the wire retainer 1950. As shown, the wire retainer is the same as the pad 1756 of FIG. 17A, but other wire retainers may be used. The wire retainer is secured in the keyway by sleeve 1950, but no sleeve is required. The wire retainer may be adhered into position. As shown, the keyway permits the pad to be positioned in the drill collar such that the inner diameter of the conduit 1920 is not diminished by the wire retainer.

FIG. 19B2 shows an alternate keyway 1970*a* having an alternate shape. The keyway 1970*a* is a convex keyway adapted to receive wire retainer 1956. The wire retainer may be secured in place by the sleeve such that the pad conforms to the keyway.

FIG. 19C depicts a cross section of the conduit 1910 of FIG. 19A taken along line 19C-19C. At this location, the keyway is not present, so that the pad and sleeve extend a distance from the conduit 1910 and thereby reduce the inner diameter of the conduit at this location.

FIGS. 20A-C are similar to FIGS. 19A-C, except that a keyway 2070 is adapted to receive both the wire retainer 2056 and the sleeve 2050 of conduit 2010. The keyway is depicted as extending from shoulder 2080 to position 1982. This configuration is adapted to position the sleeve and wire retainer such that they do not reduce the inner diameter of the conduit 2010 and permit maximum flow area therethrough.

FIG. 20B1 shows a cross section of the conduit of FIG. 20A taken along line 20B1-20B1. FIG. 20B2 shows an alternate configuration of FIG. 20B1 without a keyway. In this configuration, the pad and wire extend above the inner diameter of the conduit. FIG. 20C shows a cross section of the conduit 2010 taken along line 20C-20C and having no keyway therethrough.

While FIGS. 19A-20C depict a single wire retainer in combination with a single sleeve, but variations may be provided. For example, a sleeve may not be required where a wire retainer is sufficiently secured. In some cases, a sleeve may be used without a wire retainer. One or more wire retainers and/or sleeves may be used.

It will be appreciated by those having ordinary skill in the art that the wired conduits described herein are well-adapted for integration in a drill string as a telemetry system of interconnected WDPs for transmitting signals in a borehole environment. Each of the conduits includes a tubular body equipped with a communicative coupler at or near each of the two ends of the tubular body, with the communicative couplers permitting signals to be transmitted between adjacent, interconnected conduits. In particular versions of such a system, e.g., an elongated pad and/or expandable tubular sleeve is positioned along an inner wall of the tubular conduit body, and one or more conductive wires extend along the pad/sleeve such that the one or more wires are disposed between the inner wall of the tubular body and at least a portion of the pad/sleeve. The one or more wires, also referred to herein as a cable, are connected between the communicative couplers so as to establish a wired link.

It will no doubt be further appreciated that the present invention facilitates certain efficiencies in manufacturing. Drill pipe, e.g., is typically manufactured in three separate pieces that are welded together. The center piece (tubular body) is a simple steel tube which is upset on either end by a forging operation. The end pieces (tool joints or end connections) start as forged steel shapes on which threads and other features are machined before they are friction welded to the tubular body.

The modifications described herein with respect to a normal conduit, in particular a drill pipe, can generally be implemented after the drill pipe has been completely manufactured.

However, certain operations may be easier if they were done during fabrication. For example, the wire passages (e.g., gun-drilled holes) from the transformer coils to the tubular pipe body could be machined at the same time as the threads and shoulders of the pipe joints. Likewise, grooves and other features could be added to the body before the friction welding operation that joins the tool joints to the tubular body, when the pipe body ID is more accessible.

Many of the methods described in the preceding sections could otherwise be advantageously incorporated into the manufacturing process, and, in some instances, according to different temporal execution of the method steps. For example, the wire-routing features could be built into the long middle section of a drill pipe prior to any upsetting and/or welding steps. Building wire-routing features in a drill pipe having a uniform ID may be simpler than conducting the same in a finished drill pipe that typically has smaller ID at the ends. Once the middle section is fitted with the wire-routing features, it can then be subjected to known up-setting and welding operations. The following construction scheme provides a built-in wire-routing feature that spans nearly 80% of the finished drill pipe length (e.g., 25 feet out of 30).

First, the metal or polymer tubular sleeve could be hydroformed inside the body before the upset operation. Since the internal diameter would be more uniform, the amount of expansion would be greatly reduced, simplifying the operation and improving the conformance. A separate routing method would be used to convey the wiring from the tool joint and past the friction weld.

Likewise, a metal sleeve could be explosion-formed inside the tubular body of the conduit before friction welding. Additionally, it may be possible to metallurgically bond the sleeve to the pipe, facilitating the upsetting process. Similarly, the metal pad could be welded in place more easily before friction welding.

Additionally, inner/outer grooves for containing the cable could be extruded, formed or machined in the tubular pipe body before the body is upset and welded. In particular, an extruded or formed groove would be much less expensive than machining, and it would be stronger and for resistant to fatigue.

Figure 21A:
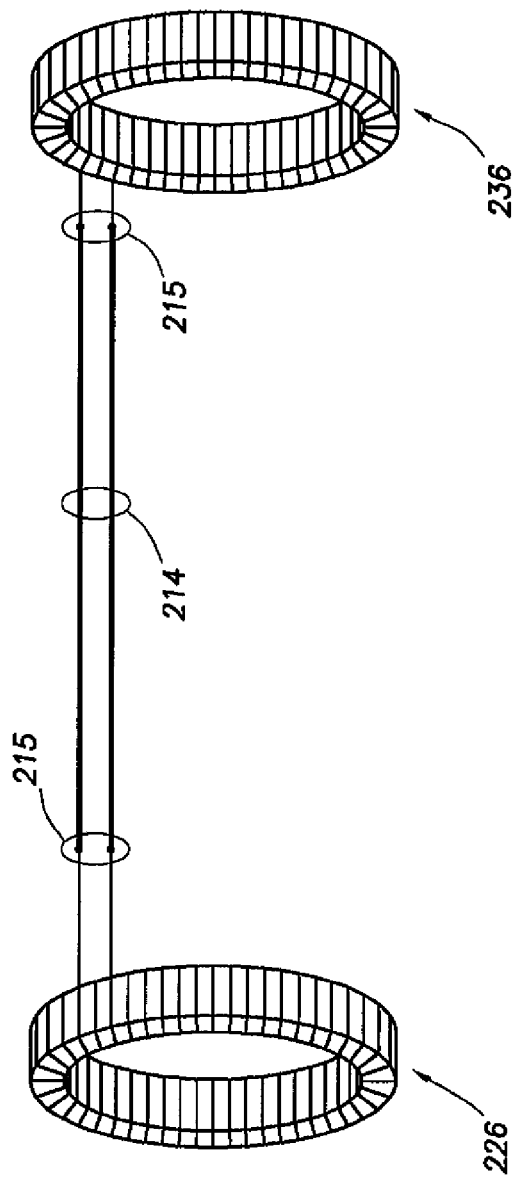
FIG. 21A schematically illustrates a wired link according to the conduits of FIGS. 2-4.

Other manufacturing modifications relate to the ability of the inventive wired conduits to withstand wiring faults or other failures. FIG. 21A schematically illustrates a wired link according to the conduits (e.g., WDPs) of FIGS. 2-4. Thus, a pair of opposing toroidal transformers 226, 236 (components of respective communicative couplers) are interconnected by a cable 214 having a pair of insulated conducting wires that are routed within the tubular body of a conduit. Each toroidal transformer employs a core material having high magnetic permeability (e.g., Supermalloy), and is wrapped with N turns of insulated wire (N~100 to 200 turns). The insulated wire is uniformly coiled around the circumference of the toroidal core to form the transformer coils (not separately numbered). Four insulated soldered, welded or crimped connections or connectors 215 are utilized to join the wires of the cable 214 with the respective coils of the transformers 226, 236.

Reliability can be critical for such WDP joints. If any wire in such a joint breaks, then the entire WDP system that employs the failing WDP joint also fails. There are several failure modes that might occur. For example, "cold solder joints" are not uncommon—where solder does not bond correctly to both wires. These can be intermittently open and then fail in the open condition. Prolonged vibration can cause wires to fatigue and break if they are not rigidly secured. Thermal expansion, shock, or debris might damage or cut the wire used to wrap the toroidal core.

Figure 21B:
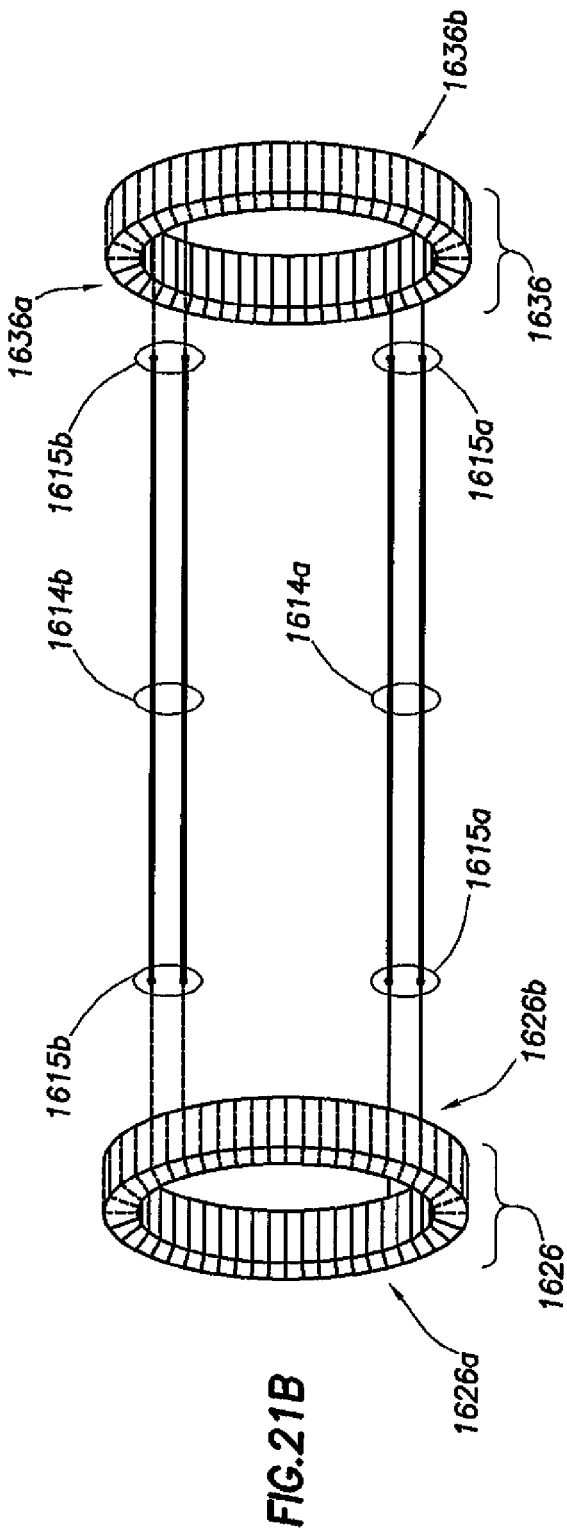
FIG. 21B schematically illustrates a pair of independent wired links for employment by a conduit.

FIG. 21B schematically illustrates a pair of independent wired links for employment by a conduit such as a WDP joint in accordance with the present invention. Thus, a pair of opposing toroidal transformers 1626, 1636 each includes a coil system having two independent coil windings, with each coil winding lying substantially within a 180° arc of the coil system. More particularly, toroidal transformer 1626 has a first coil winding 1626a and a second coil winding 1626b, each of which is independently and uniformly coiled about half the circumference of the toroidal core of transformer 1626. Similarly, toroidal transformer 1636 has a first coil winding 1636a and a second coil winding 1636b, each of which is independently and uniformly coiled about half the circumference of the toroidal core of transformer 1636. A pair of insulated conducting wires, referred to as cable 1614a, extend between and are connected at respective ends thereof to the coil windings 1626a, 1636a by way of four insulated solder joints 1615a. Similarly, a pair of insulated conducting wires, referred to as cable 1614b, extend between and are connected at respective ends thereof to the coil windings 1626b, 1636b by way of four insulated solder joints 1615b. Cable 1614a is routed independently of cable 1614b (meaning separate electrical pathways, but not necessarily remote routing locations within a WDP) so that the cables and their respective interconnected coil windings establish two independently-wired links.

It will be appreciated that WDP reliability may be improved by using a double wrap (or other multiple wrap) configuration as shown in FIG. 21B. In this design, there is a second, redundant circuit. Each toroidal core is wrapped with two separate coil windings (indicated by the dotted and dashed lines). Each winding may have the same number of turns (M). However, the two wraps could have a different number of turns (N) and still provide most of the benefits of redundancy. If M=N, then the electromagnetic properties of the new design are essentially the same as the previous design.

Because the two circuits are in parallel, if one circuit fails, the other circuit typically can still carry the telemetry signal. Furthermore, the characteristic impedance of the transmission line should not change significantly, so that such a failure will likely not increase the attenuation. The series resistance of the connecting wires may increase in this section of drill pipe if one circuit has failed, but the series resistance of the connecting wires may not dominate the transmission loss anyway. The leakage flux from the toroidal core may also increase slightly if one circuit fails, but this may also have a minor effect as well. Because the core's magnetic permeability is relatively very large, most of the flux from the one winding should still remain in the core.

Uncorrelated failures should be significantly reduced. For example, suppose that cold solder joints are uncorrelated with an occurrence rate of $10^{-3}$ per soldering operation. Assume 660 drill pipes (20,000 ft) with a single circuit and four solder joints/drill pipe. The number of cold solder joints for this system is then $(10^{-3})(660)(4)$~3. If only one of these cold solder joints fail during a bit run, the WDP system may fail. Now consider WDP with the redundant, second circuit. Each drill pipe now has 8 solder joints, so a 20,000 ft drill string will have $(10^{-3})(660)(8)$~6 cold solder joints. However, if one of these solder joints fails, then the second circuit may continue to carry the signal. The odds of the second circuit failing due to a cold solder joint is now ~$10^{-3}$.

Another type of failure may result if a stone or other small object comes into contact with a coil winding and crushes or cuts the wire. If each of the two windings lie substantially within a 180° arc on opposite halves of the toroidal transformer, then the chances that both windings will be damaged is greatly reduced. Physically separating the two windings is thus preferable, but it is also possible to intersperse the two windings so that each occupies 360° of the toroidal core.

If the two circuits are routed on two different paths along the drill pipe between the toroidal transformers, the chances of both circuits being damaged simultaneously is further reduced. For example, if there are any sharp edges in the channels that carry the wires along the drill pipe, then shock and vibration may cause the wires to rub against such sharp edges and be cut. Such sharp edges might result from an incomplete deburring of the mechanical parts during manufacturing.

It will be understood from the foregoing description that various modifications and changes may be made in the preferred and alternative embodiments of the present invention without departing from its true spirit. For example, in the independent wired link aspect of the present invention, three or more circuits could be employed in wired drill pipes for a greater degree of redundancy. In this case, each winding would lie substantially within a 120° arc of the toroidal transformer. Thus, even if two circuits failed in one drill pipe, the third circuit would still carry the signal.

Other types of inductive couplings would also benefit from redundant circuits. For example, known WDP systems employ inductive couplers at each end of a drill pipe, with each coupler comprising one or more wire loops within magnetic cores. However, such systems contain only one circuit per drill pipe. According to the independent wired link aspect of the present invention, two or more independent circuits could be used, wherein each circuit consisted of one loop of wire per coupler and the connecting wires between the two couplers.

FIGS. 22A-D describe techniques for protecting the torroidal transformer 226 of a coupler 220 of FIGS. 2-4. Each of these Figures depicts a detailed portion of the WDP joint 210 depicting various versions of the slot 225 that hosts the torroidal transformer 226. A transformer retainer, typically in the shape of a ring, is positioned in a slot 225 in the end of the WDP joint 210.

As shown in FIG. 22A, the transformer 226 is positioned in slot 225 with cables 214 extending therefrom into wire channel 2290. A potting material 2295 may be disposed about transformer 226. Details concerning the transformer 226, potting material 2295 and other features of the coupler 220 are further described in U.S. Pat. No. 6,641,434, previously incorporated by reference herein. Potting material may be inserted into the groove after placement of the transformer in the groove. Alternatively, the transformer may be pre-potted prior to insertion in the groove thereby providing a drop in transformer.

A transformer retainer 2297 is positioned in slot 225 to secure and protect the transformer 226 therein. The transformer retainer 2297 is positioned in an opening of the slot 225. The transformer retainer 2297 as shown is frictionally positioned in the slot 225. The transformer retainer is preferably a non-conductive material, such as a composite, that may be used to seal the slot. A bonding material may be used to secure the transformer retainer in place. Preferably, the transformer retainer is positioned at or below the surface of the wire retainer. In some cases, the transformer retainer may be machined to reduce the transformer retainer to the desired position within the slot 225.

FIG. 22B depicts an alternate slot 225*a* and transformer retainer 2297*a*. This figure depicts an alternate geometry for slot 225. The slot and/or retainer may be a variety of geometries adapted to facilitate manufacture of the WDP joint, to facilitate placement of the transformer in the slot and/or to facilitate the function of the coupler.

The transformer retainer 2297*a* is positioned in slot 225*a*. As shown, the transformer retainer is a metal or other conductive material attached to a wall of slot 225*a*. The retainer may be provided with teeth 2299 (or other gripping device) adapted to adhere the retainer to a surface of slot 225*a*. Where a metal retainer is used, the retainer is typically in contact with only one surface of sot 225*a* to prevent a short in the coupler 220. The potting material may be disposed about the retainer to further seal the slot and/or protect the transformer. In this case, the retainer is positioned a distance below the surface of the WDP joint 210. The potting material may be placed in the slot before, during and/or after placing the retainer in the slot. The potting material may be added to fill the slot.

Figure 22D:
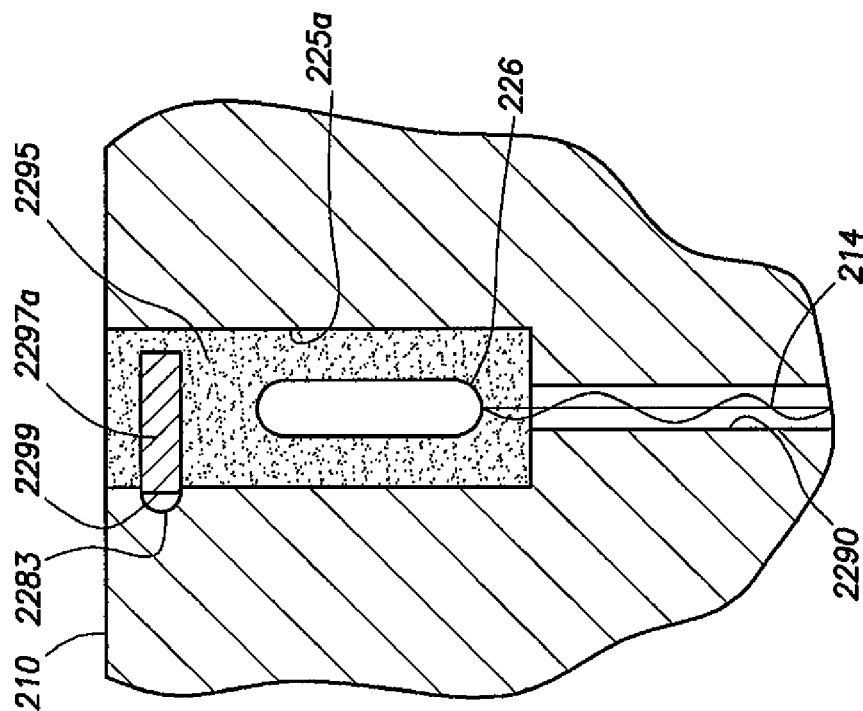
Figure 22C:
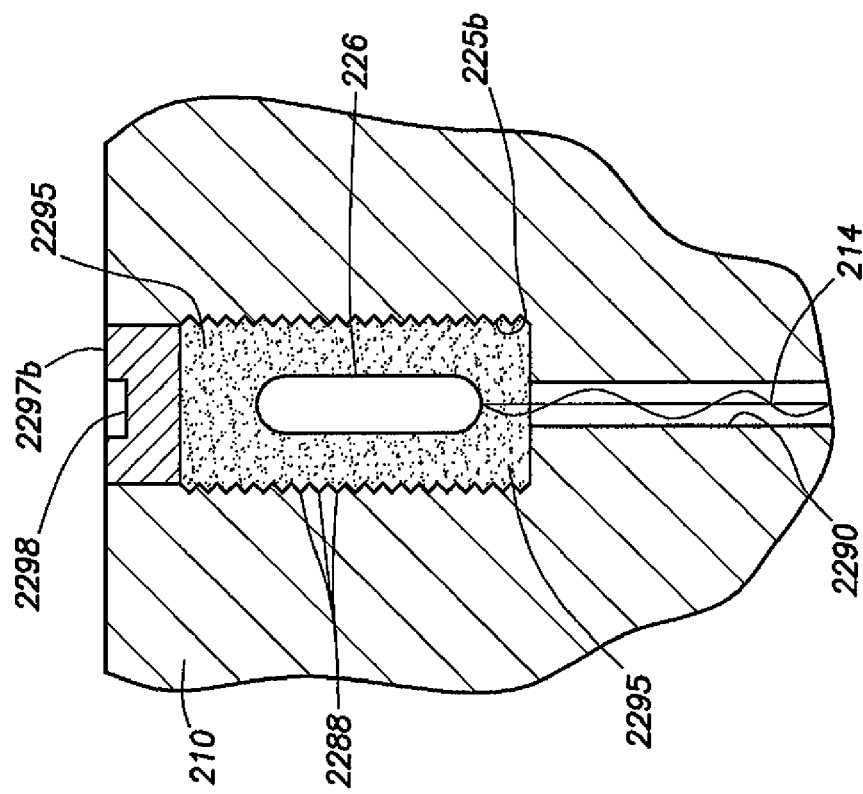

FIG. 22C depicts an alternative slot 225*b* and transformer retainer 2297*b*. The slot 225*b* is depicted as having pockets 2288 adapted to receive the potting material. The pockets may also be used to receive bonding or other material to secure the transformer in place. The additional area within slot 225*b* may be used to further secure the transformer and prevent removal thereof.

The pockets may be in the form of threads extending through one or both walls of the slot 225*b*. These pocket threads and/or other threads may be provided in the slot 225*b*. Such threads may be used to receive and position the retainer 2297*b* within slot 225*b*. Retainer 2297*b* may be threadedly inserted into slot 225*b* at the desired depth. An aperture 2298 or other cavity may be positioned in retainer 2297*b* to receive a tool that may be used to install the retainer 2297*b*. Typically two such apertures are provided in the retainer so that the ring may be gripped and rotated into position.

FIG. 22D depicts an alternate retainer configuration. This retainer is substantially the same as the retainer 2297*a* of FIG. 22B, except that the WDP joint 210 is provided with a channel 2283 adapted to receive the retainer 2297*a* and secure it in place.

It is typically desirable for two adjacent pipe joints to be sufficiently tightened (ie. forced together with the torque needed to achieve proper pipe-sealing of an outer end against an outer shoulder of an adjacent wire pipe), to allow the same torque to automatically tighten the inner shoulder against the inner pipe end of an adjacent wired pipe joint so as to reliably form a closed high-conductivity, low permeability toroidal path. In some cases, the contact between couplers in adjacent pipes may be insufficient to allow electrical communication therebetween. FIGS. 23A-24 depict techniques for adjusting the WDP joint to enable facilitate contact therebetween.

FIGS. 23A-D are detailed views of an end of a WDP joint 210 depicting the transformer 226 positioned in the slot 225. Each of these figures depicts a WDP joint that may be machined or adjusted from an original dimension (shown in solid line) to a reduced dimension (shown in dashed line).

FIG. 23A depicts the WDP joint 210, transformer 226, slot 225*a* and wire retainer 2297*a* of FIG. 22B. The wire retainer 2297*a* is positioned a distance below the end 2375 of WDP joint 210. The WDP joint may be machined and reduced as indicated by the dashed lines. Threads 2377 may also be machined to define the same or different threads to facilitate connection with an adjacent WDP joint.

Figure 23B:
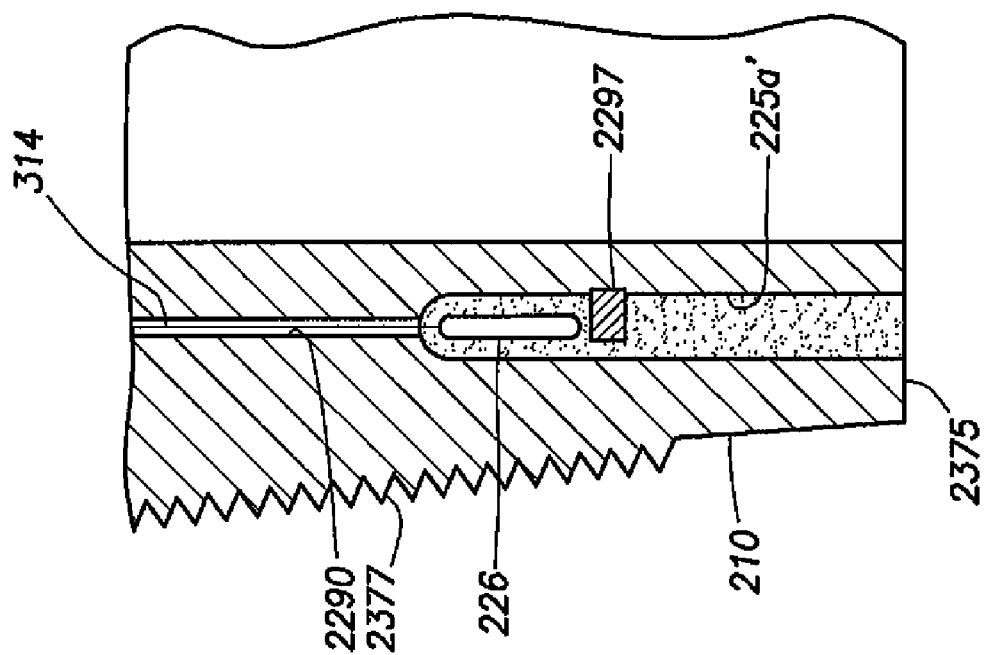
FIGS. 23A-D depict detailed views of a portion of a conduit having a transformer secured therein such that an end of the may be machined.
Figure 23A:
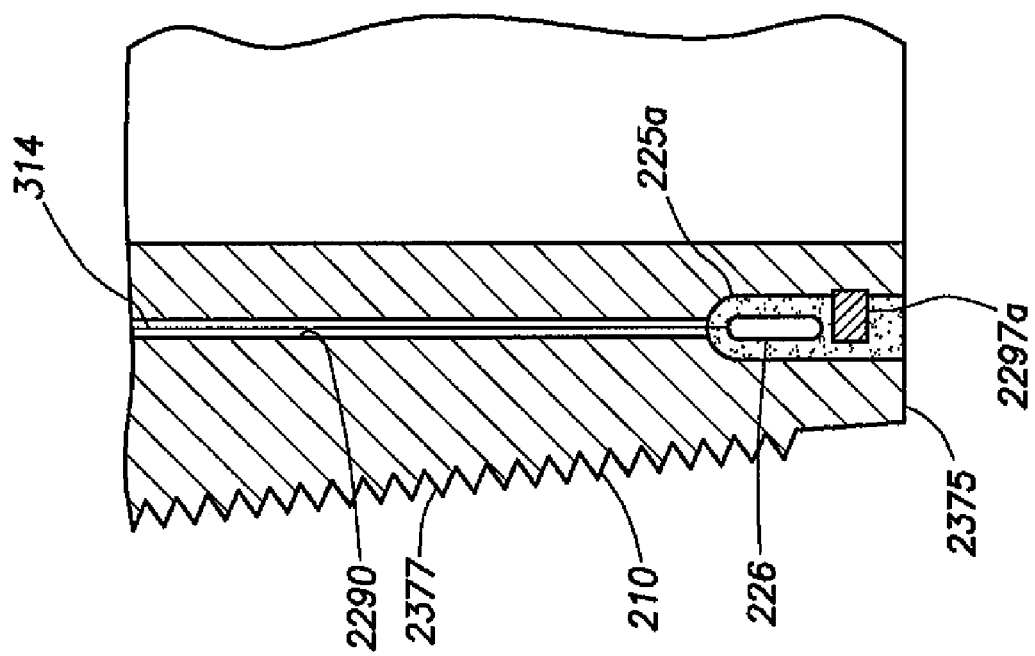
Figure 24:
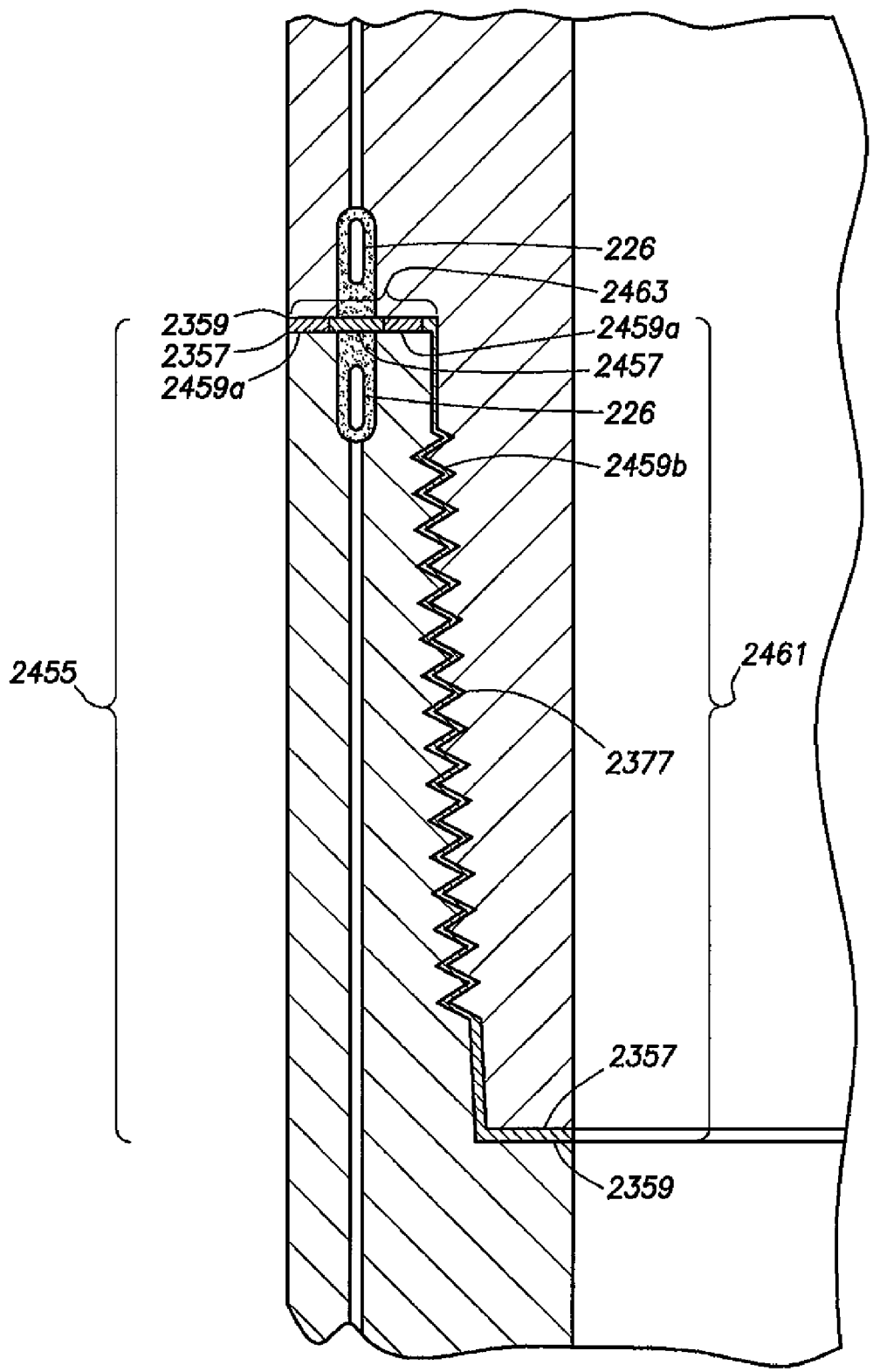
FIG. 24 depicts a detailed view of adjacent WDP joints with a spacer therebetween.

FIG. 23B shows an alternate configuration of the WDP joint 210 and retainer 2297*a*. As shown in this figure, the slot may be machined a distance from the end 2375 of the WDP joint. The transformer is preferably positioned in slot 225*a'* at a depth sufficient to permit machining of the end of the WDP joint without damage to the coupler. The depth may be adjusted as desired. Depending on the depth of the coupler, the WDP joint may be re-machined as necessary. In some cases, the retainer may also be machined or replaced such that it may still function to protect the transformer.

Figure 23D:
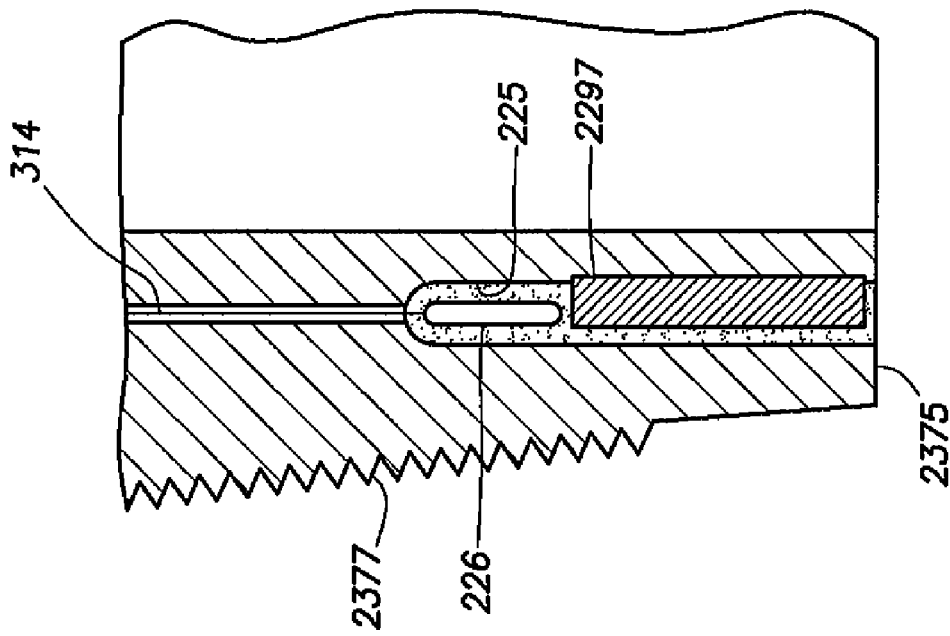
Figure 23C:
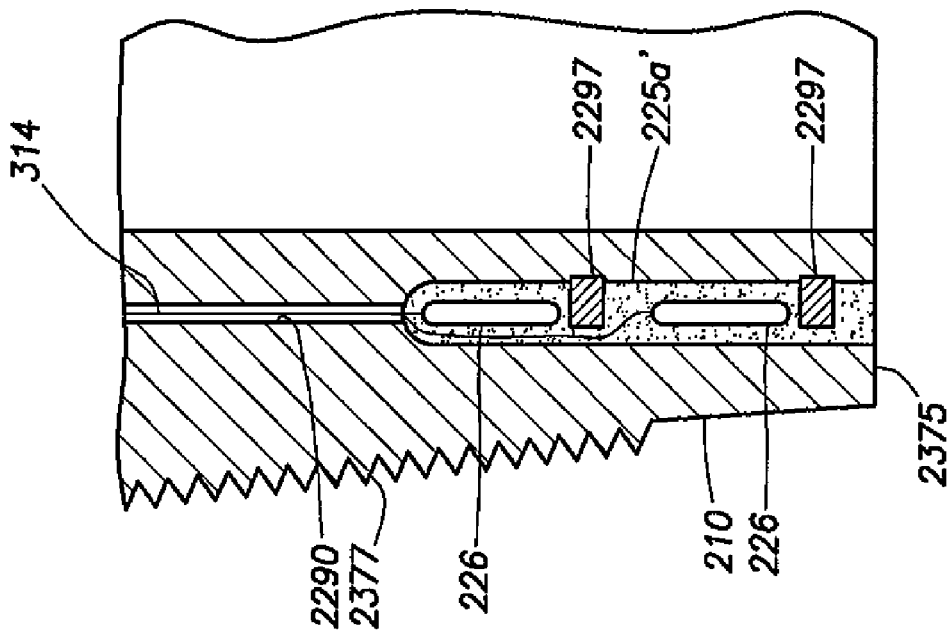

As shown in FIG. 23C, redundancy may be provided by adding a second transformer 226, cable 314 and/or retainer 2297. In this case, the end 2375 may be machined to remove the first coupler and wire retainer, and still have a second transformer available for use. One or more redundant transformers and cable may be provided. As shown, the redundant transformers are positioned in the same groove on a shoulder of a conduit. However, redundant transformers and/or grooves may be located at other positions about the same or other ends of the conduit. In cases where multiple transformers and/or cables are provided, signals may be sent through one or both transformers.

FIG. 23D depicts an alternate transformer 226 and transformer retainer 2297 in WDP joint 210, The transformer and retainer depicted in FIG. 23D are the same as those depicted in FIG. 22A, except that the slot 225 has been extended in the end 2375 of WDP joint 210, and the retainer 2297 has been extended to fill the additional area of the slot. The retainer may be extended as shown, or positioned in the slot with additional potting material. As shown, the retainer will be machined with the end of the WDP joint and reduced as shown by the dashed lines.

The configurations of the extended slot and machinable ends of FIG. 23A may be used with any of retainer or slot configurations.

FIG. 24 depicts an alternate technique for facilitating good contact between adjacent WDP joints. A spacer 2455 is positioned between adjacent WDP joints to fill any gap therebetween. The spacer may be a solid component threadedly attached to an end of a WDP joint for threaded connection with an adjacent WDP joint. Typically, threaded pipe spacers may be of metal. However, a non-conductive portion 2457 is placed in a portion of the spacer to enable the transformer 226 to generate the toroidal path. As shown, the non-conductive portion is positioned adjacent slots 225 in adjacent drill pipes, and conductive portions 2459a and b are positioned in the remaining portions.

The spacer may be a unitary piece extending across the entire connection. Alternatively, a first portion 2461 of the spacer may be formed of a conventional threaded spacer, and a second portion 2463 may be an insert positionable adjacent the ends 2357 of adjacent WDP joints. Part or all of the spacer may be used as necessary to fill gaps between the WDP joints. The spacers may be threadedly connected along the WDP joint threads 2377 or attached by bonding or welding. One or more spacers or portions of the spacer may be used as necessary. Preferably, the spacers provide sufficient contact to support the WDP joints, prevent fluid flow between the WDP joints and permit communication between the WDP joints. At least a portion of the spacer may be provided with wear resistant material. For example, portion 2457 may be a wear ring.

The distance between shoulders 2357 and 2359 of a first WDP joint may be the same or slightly different from the distance between shoulders 2357 and 2359 of an adjacent WDP joint.

It will be further appreciated by those having ordinary skill in the art that the present invention, according to its various aspects and embodiments, will not be limited to WDP applications. Thus, e.g., the wired links and related aspects of the present invention may be applied to advantage in downhole tubing, casing, etc. that is not used for drilling. One such application would relate to permanent subsurface installations that employed sensors for monitoring various formation parameters over time. Accordingly, the present invention could be employed in such permanent monitoring applications for achieving communication between the surface and permanent subsurface sensors. Moreover, various configurations and/or devices may be used in combination. For example, the spacer of FIG. 24 may be used in combination with the redundant coupler of FIG. 23C.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open set or group. Similarly, the terms "containing," having," and "including" are all intended to mean an open set or group of elements. "A," "an" and other singular terms are intended to include the plural forms thereof unless specifically excluded. Additionally, the method claims are not to be limited by the order or sequence in which the steps of such claims are presented. Thus, e.g., a first-recited step of a method claim does not necessarily have to be executed prior to a second-recited step of that claim.

What is claimed is:

1. A drill pipe segment, comprising:
a tubular body having an axial bore;
a box end disposed at a first end of the tubular body having a first communicative coupler disposed in the box end;
a pin end disposed at a second end of the tubular body having a second communicative coupler disposed in the pin end;
a conductor connected to the first communicative coupler, connected to the second communicative coupler, and extending through at least a portion of the axial bore;
a pre-formed elongated pad positioned proximate an inner wall of the tubular body, wherein the pre-formed elongated pad includes a pre-formed groove or hole;
an expandable sleeve disposed within the axial bore of the tubular body;
wherein the pre-formed elongated pad is radially positioned between the expandable sleeve and an inner wall of the tubular body, and wherein the conductor is disposed within the pre-formed groove or hole in the pre-formed elongated pad over at least a portion of the length of the conductor.

2. The drill pipe segment of claim 1, wherein the elongated pad is secured to the inner wall of the tubular body.

3. The drill pipe segment of claim 1, wherein a path of the elongated pad along a length of the tubular body is one of straight, helical, sinusoidal, and combinations thereof.

4. The drill pipe segment of claim 1, wherein an inner wall of the tubular body includes a keyway, and the elongated pad is disposed within the keyway.

5. The drill pipe segment of claim 1, wherein the elongated pad comprises at least one wire retainer.

6. The drill pipe segment of claim 1, wherein the elongated pad forms a cylindrical segment that substantially compliments the inner wall of the tubular body.

7. The drill pipe segment of claim 1, wherein the elongated pad is constructed from one of a metallic material, fiberglass, an elastomeric material, and combinations thereof.

8. The drill pipe segment of claim 1, wherein the first and second communicative couplers comprise inductive coupler elements.

9. The drill pipe segment of claim 1, wherein the conductor path along a length of the tubular body is one selected from a straight path, a helical path, a sinusoidal path, and combinations thereof.

10. The drill pipe segment of claim 1, wherein the first and second communicative couplers each comprise a current loop transformer.

11. The drill pipe segment of claim 1, wherein the expandable sleeve is in an plastically expanded state.

12. The drill pipe segment of claim 11, wherein the expandable sleeve was expanded by one of a mechanical mandrel, a hydraulic mandrel, the application of hydraulic pressure, and an explosive charge.

13. The drill pipe segment of claim 12, wherein the expandable sleeve is metallurgically bonded to an inner wall of the tubular body.

14. The drill pipe segment of claim 11, wherein the expandable sleeve comprises a plurality of axially oriented slots to facilitate expansion.

15. A method of making a drill pipe segment, comprising:
(a) providing a tubular body having an axial bore, a box end disposed at a first end of the tubular body, a pin end disposed at a second end of the tubular body, and a conductor, wherein the box end includes a first communicative coupler, the pin end includes a second communicative coupler, and the conductor is connected to the first and second communicative couplers and extends along the axial bore;
(b) providing an expandable sleeve and a pre-formed elongated pad that is distinct and separate from the expandable sleeve;
(c) inserting the pre-formed elongated pad into the axial bore;
(d) inserting the expandable sleeve into the axial bore;
(e) radially positioning the pre-formed elongated pad between the expandable sleeve and the inner surface of the tubular body;
(f) positioning at least a portion of the conductor between the inner wall of the tubular body and the expandable sleeve;
(g) plastically expanding the expandable sleeve into engagement with the pre-formed elongated pad and the inner wall of the tubular body after (e).

16. The method of claim 15, wherein plastically expanding the expandable sleeve comprises driving a mandrel through the expandable sleeve.

17. The method of claim 16 wherein the mandrel comprises one selected from a mechanical mandrel and a hydraulic mandrel.

18. The method of claim 15, wherein plastically expanding the expandable sleeve comprises detonating an explosive charge within the tubular sleeve.

19. The method of claim 15, wherein plastically expanding the expandable sleeve comprises applying hydraulic pressure to an interior of the expandable sleeve.

20. The method of claim 15, further comprising:
positioning at least a portion of the length of the conductor in a groove or hole formed in the elongated pad prior to (g).

21. The method of claim 15, further comprising:
securing the elongated pad to the inner wall of the tubular body after (c) and before (g).

22. The method of claim 15, further comprising bonding the elongated pad to the inner wall of the tubular body.

23. The method of claim 22, wherein bonding the elongated pad to the inner wall of the tubular body comprises one of welding, adhesion, and epoxy bonding.

24. The method of claim 15, further comprising pre-forming the expandable sleeve to predispose a portion of the expandable sleeve to initiate expansion.

25. The method of claim 24, wherein pre-forming the expandable sleeve comprises applying a localized mechanical force to the inner wall of the tubular sleeve to displace a portion of the expandable sleeve one selected from inwardly, outwardly, or combinations thereof.

26. The method of claim 24 wherein pre-forming the expandable sleeve comprises reducing a wall thickness of the expandable sleeve at a selected location.

27. The method of claim 24 wherein pre-forming the expandable sleeve comprises reinforcing the expandable sleeve at one or more selected locations.

* * * * *

UNITED STATES PATENT AND TRADEMARK OFFICE
CERTIFICATE OF CORRECTION

PATENT NO. : 7,777,644 B2  Page 1 of 1
APPLICATION NO. : 11/564024
DATED : August 17, 2010
INVENTOR(S) : Rahgu Madhavan It is certified that error appears in the above-identified patent and that said Letters Patent is hereby corrected as shown below:

Title Page, Item 73

Please correct Assignee's name to read:

IntelliServ, LLC

Signed and Sealed this
Twelfth Day of April, 2011

David J. Kappos
*Director of the United States Patent and Trademark Office*